United States Patent
Yanagawa et al.

(10) Patent No.: US 7,167,228 B2
(45) Date of Patent: Jan. 23, 2007

(54) LIQUID CRYSTAL DISPLAY DEVICE WITH TWO KINDS OF PROJECTED PORTIONS ON A SUBSTRATE

(75) Inventors: Kazuhiko Yanagawa, Mobara (JP); Keiichiro Ashizawa, Mobara (JP); Masahiro Ishii, Mobara (JP); Masayuki Hikiba, Mobara (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/365,629

(22) Filed: Feb. 13, 2003

(65) Prior Publication Data

US 2003/0151716 A1  Aug. 14, 2003

Related U.S. Application Data

(63) Continuation of application No. 09/542,870, filed on Apr. 4, 2000, now Pat. No. 6,583,846.

(30) Foreign Application Priority Data

Apr. 14, 1999 (JP) .......................................... 11-106382
Apr. 14, 1999 (JP) .......................................... 11-106383

(51) Int. Cl.
G02F 1/1339 (2006.01)

(52) U.S. Cl. ........................ 349/156; 349/155; 349/157
(58) Field of Classification Search .......... 349/155–157
See application file for complete search history.

(56) References Cited

U.S. PATENT DOCUMENTS

| 4,385,806 | A | * | 5/1983 | Fergason ..................... 349/34 |
| 5,298,199 | A | * | 3/1994 | Hirose et al. ............... 349/117 |
| 5,852,485 | A | | 12/1998 | Shimada et al. |
| 5,917,572 | A | | 6/1999 | Kurauchi et al. |
| 5,949,511 | A | * | 9/1999 | Park ........................... 349/141 |
| 5,978,061 | A | | 11/1999 | Miyazaki et al. |
| 5,978,062 | A | | 11/1999 | Liang et al. |
| 5,995,186 | A | * | 11/1999 | Hiroshi ....................... 349/141 |
| 6,067,144 | A | * | 5/2000 | Murouchi ................... 349/156 |
| 6,115,098 | A | * | 9/2000 | Kume et al. ................ 349/156 |
| 6,208,402 | B1 | * | 3/2001 | Tajima ....................... 349/156 |
| 6,211,937 | B1 | | 4/2001 | Miyachi et al. |
| 6,317,188 | B1 | * | 11/2001 | Shibahara ................... 349/141 |
| 6,330,049 | B1 | * | 12/2001 | Kume et al. ................ 349/156 |
| 6,341,003 | B1 | | 1/2002 | Ashizawa |
| 6,356,335 | B1 | * | 3/2002 | Kim et al. .................. 349/156 |
| 6,583,846 | B1 | * | 6/2003 | Yanagawa et al. .......... 349/155 |
| 6,661,488 | B1 | * | 12/2003 | Takeda et al. .............. 349/117 |
| 6,742,452 | B1 | * | 6/2004 | Mayer et al. ............... 101/365 |

FOREIGN PATENT DOCUMENTS

| JP | 07-225389 | 2/1994 |
| JP | 07-311383 | 5/1994 |
| JP | 09-073099 | 9/1995 |
| JP | 08076131 | 3/1996 |
| JP | 08114809 | 5/1996 |
| JP | 09-120075 | 8/1996 |
| JP | 10/232398 | 2/1997 |
| JP | 10-221694 | 6/1997 |
| JP | 10048636 | 2/1998 |

\* cited by examiner

*Primary Examiner*—Huyen Ngo
(74) *Attorney, Agent, or Firm*—Reed Smith LLP; Stanley P. Fisher, Esq.; Juan Carlos A. Marquez, Esq.

(57) ABSTRACT

A liquid crystal display device includes first and second substrates, a liquid crystal layer sandwiched between the first and second substrates, a pixel electrode formed on the first substrate, and a counter electrode formed on the second substrate. A plurality of projected portions are formed on the second substrate in a pixel area. The plurality of projected portions includes a first projected portion and a second projected portion, and the first projected portion is longer than the second projected portion in the pixel area.

12 Claims, 25 Drawing Sheets

LIQUID CRYSTAL DISPLAY DEVICE WITH TWO KINDS OF PROJECTED PORTIONS ON A SUBSTRATE

This application is a continuation application of U.S. application Ser. No. 09/542,870 filed on Apr. 4, 2000 now U.S. Pat. No. 6,583,846.

BACKGROUND OF THE INVENTION

The present invention relates to a liquid crystal display device, and particularly to a liquid crystal display device provided with spacers sandwiched between a pair of opposing substrates with a liquid crystal layer interposed therebetween.

Placement of spacers between a pair of opposing substrates with a liquid crystal layer therebetween can establish a uniform thickness of the liquid crystal layer and thereby prevent occurrence of non-uniformity in a displayed image.

Beads, for example, are used as spacers. Initially beads are dispersed on a surface of one of a pair of substrates facing toward a liquid crystal layer, and then the other of the pair of substrates is overlapped over the one of the pair. But the surfaces of the substrates are uneven, some spacers are positioned in indented portions in the surfaces of the substrates, others are positioned in raised portions in the surfaces in the substrates, and consequently, the desired spacing between the pair of substrates are not sometimes obtained.

There is another type of spacers which are fixed at predetermined positions on a surface of one of a pair of substrates facing toward a liquid crystal layer before the other of the pair of substrates is overlapped over the one of the pair. The spacers are formed only on indented portions in the uneven substrate, for example, and consequently, the desired spacing between the pair of substrates is obtained.

Spacers are disclosed in Japanese Patent Application Laid-open No. Hei 8-76131 (laid-open on Mar. 22, 1996), Japanese Patent Application Laid-open No. Hei 8-114809 (laid-open on May 7, 1996) and Japanese Patent No. 2,907,137 (registered on Apr. 2, 1999).

SUMMARY OF THE INVENTION

The spacers of the above-explained type having the spacers fixed on a substrate have the above advantage and can also improve the display quality further by optimizing the arrangement of the spacers.

The present invention has been made in this situation, and the purpose of the present invention is to provide a liquid crystal display device having the quality of a displayed image improved.

The representative ones of the inventions disclosed in this specification can be summarized as follows.

To accomplish the above object, in accordance with an embodiment of the present invention, there is provided a liquid crystal display device comprising: a pair of opposing substates, at least one of said pair of opposing substrates being transparent, a liquid crystal film sandwiched between said pair of opposing substates, a plurality of electrodes of a first kind disposed on an inner surface of one of said pair of opposing substrates for defining a plurality of pixels, at least one electrode of a second king disposed on an inner surface of one of (1) said one of said pair of opposing substrates so as to be adjacent to, but spaced from said plurality of electrodes of said first kind and (2) another of said pair of opposing substrates so as to face said plurality of electrodes of said first kind, and at least one spacer disposed approximately at a center of at least one of said plurality of pixels for establishing a spacing between said pair of opposing substrates, said at least one spacer being fixed to one of said pair of opposing substrates and covered with one of (1) a corresponding one of said plurality of electrodes of said first kind and (2) a corresponding one of said at least one electrode of said second kind.

To accomplish the above object, in accordance with anther embodiment of the present invention, there is provided a liquid crystal display device comprising: a pair of opposing substrates, at least one of said pair of opposing substrates being transparent, a liquid crystal film sandwiched between said pair of opposing substrates, a plurality of electrodes of a first kind disposed on an inner surface of one of said pair of opposing substrates for defining a plurality of pixels, at least one electrode of a second kind disposed on an inner surface of one of (1) said one of said pair of opposing substrates so as to be adjacent to, but spaced from said plurality of electrodes of said first kind and (2) another of said pair of opposing substrates so as to face said plurality of electrodes of said first kind, and at least one spacer disposed approximately at a center of at least one of said plurality of pixels for establishing a spacing between said pair of opposing substrates, said at least one spacer being fixed to one of said pair of opposing substrates and covered with one of (1) a corresponding one of said plurality of electrodes of said first kind and (2) a corresponding one of said at least one electrode of said second kind, and another of said corresponding one of said plurality of electrodes of said first kind and said corresponding one of said at least one electrode of said second kind being patterned so as not to face said at least one spacer.

To accomplish the above object, in accordance with still an embodiment of the present invention, there is provided a liquid crystal display device comprising: a pair of opposing substrates, at least one of said pair of opposing substrates being transparent, a liquid crystal film sandwiched between said pair of opposing substrates, a plurality of electrodes of a first kind disposed on an inner surface of one of said pair of opposing substrates for defining a plurality of pixels, a plurality of wiring lines of a first kind coupled to said plurality of electrodes of said first kind, at least one electrode of a second kind disposed on an inner surface of one of (1) said one of said pair of opposing substrates so as to be adjacent to, but spaced from said plurality of electrodes of said first kind and (2) another of said pair of opposing substrates so as to face said plurality of electrodes of said first kind, at least one wiring line of a second kind coupled to said at least one electrode of said second kind, and at least one spacer disposed approximately at a center of at least one of said plurality of pixels for establishing a spacing between said pair of opposing substrates, said at least one spacer being fixed to one of said pair of opposing substrates and covered with one of (1) a corresponding one of said plurality of electrodes of said first kind and (2) a corresponding one of said at least one electrode of said second and said at least one spacer being disposed so as to face one of (1) said plurality of wiring lines of said first kind and (2) said at least one wiring line of said second kind.

In the liquid crystal display device employing a spacer covered with an electrode, directions of electric fields generated between the side wall of the spacer and another electrode are different from directions of electric fields generated by the electrode and the another electrode in the remaining region of one pixel associated with the spacer, and consequently, the so-called "multi-domain" effect is produced in the region in the vicinity of the side wall. The reversal in transmitted light intensity through the liquid crystal layer occurs at viewing angles deviating considerably from the main anticipated viewing angle due to the angular dependence of the electro-optic characteristics of the liquid crystal layer. The so-called multi-domain effect is that obtained by subdividing one pixel into a plurality of regions provided with different angular dependence of the electro-optic characteristics to reduce the angular dependence of the one pixel as a whole and thereby to eliminate or reduce the above-mentioned reversal in transmitted light intensity.

And in the liquid crystal display device of the horizontal electric field type described subsequently, the optimum arrangement of spacers is secured.

BRIEF DESCRIPTION OF THE DRAWINGS

In the accompanying drawings, in which like reference numerals designate similar components throughout the figures, and in which.

DETAILED DESCRIPTION OF THE PREFERRED EMBODIMENTS

The embodiments of the liquid crystal display device according to the present invention will be explained by reference to the drawings.

Embodiment 1

Figure 1A:
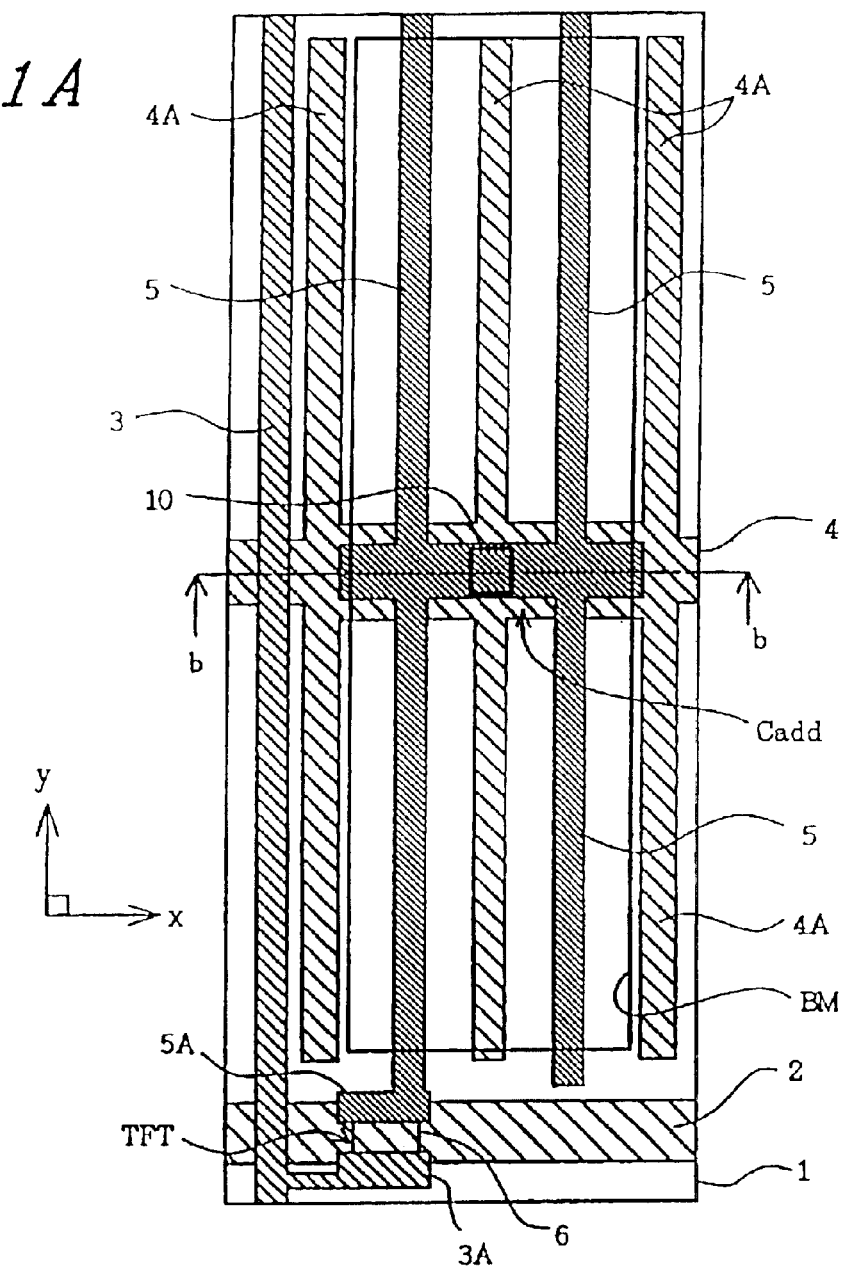
FIG. 1A is a plan view of a pixel in a liquid crystal display device in accordance with an embodiment of the present invention.
Figure 1B:
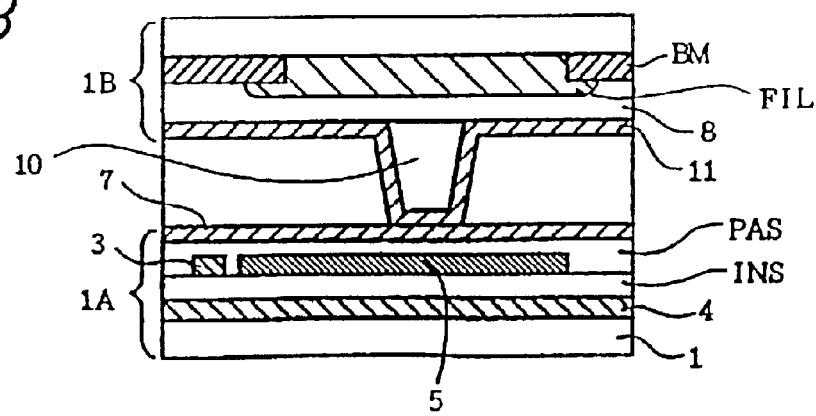
FIG. 1B is a cross-sectional view of the pixel taken along line b—b of FIG. 1A.

FIGS. 1A and 1B illustrate a configuration of an embodiment of the liquid crystal display device according to the present invention. FIG. 1A is a plan view of one of a plurality of pixels in a liquid crystal display device of the so-called horizontal electric field type, FIG. 1B is a cross-sectional view of the pixel of FIG. 1A taken along line b—b of FIG. 1A.

The pixels as illustrated in FIGS. 1A and 1B are arranged in the form of a matrix to constitute a display area.

In the liquid crystal display device of the horizontal electric field type (commonly called the in-plane switching (IPS) type), the transmission of light at each pixel is controlled by a horizontal electric field applied in parallel with a layer of liquid crystal material sandwiched between opposing transparent electrodes formed on the inner surfaces of the opposing transparent substrates. Each pixel is formed by two electrodes formed on one of a pair of opposing substrates. For the purpose of device construction and operation, U.S. Pat. No. 5,598,285, issued to Kondo et al. on Jan. 28, 1997, is hereby incorporated by reference.

On a surface on a liquid crystal layer side of one of a pair of opposing transparent substrates sandwiching the liquid crystal layer, a scanning signal line (a gate line) 2 extends in the x direction in FIG. 1A and is made of a chromium film, for example. As shown in FIG. 1A, the gate line 2 is disposed below the pixel area, for example, to maximize the effective area of the pixel. The gate line 2 is supplied with a gate signal from a circuit external to the display area so as to drive a thin film transistor TFT described subsequently.

Approximately at the center of the pixel area, a counter-voltage signal line 4 extends in the x direction in FIG. 1A and is made of the same material as the gate line 2, for example. A plurality (three, for example) of counter electrodes 4A made integrally with the counter-voltage signal line 4 extend in a direction perpendicular to the counter-voltage signal line 4, i. e. ±y direction, for example.

The counter electrodes 4A are supplied with a signal serving as a reference voltage for a video signal supplied to a pixel electrode 5 subsequently described via the counter-voltage signal line 4, so as to generate an electric field of the strength corresponding to the video signal between the pixel electrode 5 and the counter electrodes 4A.

The generated electric field contains a component parallel with the major surface of the transparent substrate 1 and this component controls light transmission through the liquid crystal layer. This type of the liquid crystal display device uses a component of an electric field in parallel with the major surface of the transparent substrate 1, and it is this reason that this type is called the horizontal electric field type. The counter-voltage signal line 4 is supplied with a reference voltage from a circuit external to the display area.

After the gate lines 2 and the counter-voltage signal lines 4 have been formed on the transparent substrate 1, an insulating film INS made of silicon nitride, for example, is formed on the surface of the transparent substrate 1 including the gate lines 2 and the counter-voltage signal lines 4.

The insulating film INS serves as a gate insulating film in an area formed with a thin film transistor TFT described subsequently, serves as an interlayer insulating film between the gate lines 2 and the counter-voltage signal lines 4 in an area formed with video signal lines (drain lines) 3 described subsequently, and serves as a dielectric film in an area formed with a capacitor Cadd described subsequently.

In the area formed with the thin film transistor TFT, a semiconductor layer 6 made of amorphous Si, for example, is disposed to overlap with the gate line 2 to form the thin film transistor TFT in conjunction with the gate line 2.

A drain electrode 3A and a source electrode 5A are disposed on the top of the semiconductor layer 6 to form the thin film transistor TFT of the so-called inverted staggered structure by using a portion of the gate line 2 as a gate electrode. The drain electrode 3A and the source electrode 5A are formed on the semiconductor layer 6 together with the pixel electrode 5 simultaneously with formation of the drain line 3, for example.

That is to say, in FIG. 1A, the drain line 3 is formed to extend in the y direction, and the drain electrode 3A formed integrally with the drain line 3 is disposed on the semiconductor layer 6.

The drain line 3 is disposed to the left of the pixel area, for example, to maximize the effective pixel area, as shown in FIG. 1A.

The source electrode 5A is formed simultaneously with the drain line 3 and integrally with the pixel electrode 5.

The pixel electrode 5 is formed to extend between the two adjacent counter electrodes 4A in the y direction in FIG. 1A. In other words, the two counter electrodes 4A are disposed on opposite sides of the pixel electrode 5, and are spaced approximately equal distances from the pixel electrode 5 so as to generate electric fields between the pixel electrode 5 and the counter electrodes 4A. A portion of the pixel electrode 5 facing the counter-voltage signal line 4 is configured so as to increase its area and to form a capacitor Cadd by using the insulating film INS as a dielectric.

The capacitor Cadd serves to store a video signal supplied to the pixel electrode 5, for example, for a comparatively longer time. The thin film transistor TFT is turned on by a scanning signal supplied from the gate line 2, a video signal from the drain line 3 is supplied to the pixel electrode 5 via the thin film transistor TFT, and then after the thin film transistor TFT is turned off, the video signal having been supplied to the pixel electrode 5 is stored in the capacitor Cadd.

Then, a protective film PAS made of silicon nitride, for example, is formed over the entire surface of the thus processed transparent substrate 1 such that the thin film transistor TFT, for example, can avoid direct contact with the liquid crystal layer. An orientation film 7 is formed on the protective film PAS so as to determine the direction of initial orientation of the liquid crystal molecules.

The thus processed transparent substrate is called the TFT substrate 1A. A liquid crystal panel is completed by superposing the TFT substrate 1A on a transparent substrate called the filter substrate 1B with a liquid crystal layer interposed therebetween such that the orientation film 7 of the TFT substrate 1A is in contact with the liquid crystal layer.

A black matrix BM is formed on the surface of the filter substrate 1B on the liquid crystal-layer side thereof for defining the contour of the pixel area as indicated in FIG. 1A, a color filter FIL is formed in the opening (a central portion of the pixel area excluding its periphery) in the black matrix BM, and a planarizing film 8 is formed on the surface of the transparent substrate 1B including the black matrix BM and the color filter FIL.

A spacer 10 is formed on the planarizing film 8 such that the spacer 10 is superposed on the approximately central portion of the area forming the capacitor Cadd. The spacer 10 is formed by coating synthetic resin, for example, on the planarizing film 8 and then by patterning the synthetic resin layer by a photolithography technique (and also by selective etching, if necessary). The height of the spacer 10 controls the spacing between the TFT substrate 1A and the filter substrate 1B sandwiching the liquid crystal layer.

The reason why the spacer 10 is superposed on the capacitor Cadd is that the width of the counter-voltage signal line 4 lying below it is made comparatively wider than that of the other signal lines, and consequently, an area of the orientation film 11 suffering from orientation defects caused by the spacer 10 explained later is prevented from passing light through the area by the counter-voltage signal line 4. Another reason is that the spacer 10 is positioned at an approximately center of the pixel area surrounded by the black matrix BM, thereby it becomes easier to control the thickness of the liquid crystal layer (the spacing between the two substrates) in the pixel.

After the spacers 10 having been formed on the filter substrate 1B, the orientation 11 is formed on the surface of the filter substrate 1B including the spacers 10 as shown in FIG. 1B.

The orientation film 11 is fabricated by coating synthetic resin, for example, on the planarizing film 8 and then rubbing the synthetic resin film. It is inevitable that orientation defects in the orientation film 11 is caused around the vicinity of the spacer 10 by rubbing the synthetic resin film. But the area suffering from the orientation defects is prevented sufficiently from passing light through the area by the light-blocking counter-voltage signal line 4 as explained above.

In the above embodiment, the spacer 10 is formed to be superposed on the capacitor Cadd, but the present invention is not limited to this arrangement. When the capacitor Cadd is of the comparatively small size, the spacer 10 may be formed to be superposed on a portion of the counter-voltage signal line 4 displaced from the capacitor Cadd. In this case, the spacer 10 may be superposed on a different signal line, for example, which traverses the pixel area.

In the above embodiment, the spacer 10 is formed on the filter substrate 1B, but the spacer 10 may be formed on the TFT substrate 1A. This arrangement provides an advantage that the spacer 10 is positioned accurately with respect to the counter-voltage signal line 4.

Embodiment 2

This embodiment explains the concrete configurations of the orientation films 7, 11 in the liquid crystal display device of Embodiment 1.

The rubbing directions of the orientation films 7, 11 correspond to the directions of the initial orientations of liquid crystal molecules, and the orientation films 7 and 11 of the TFT substrate 1A and the filter substrate 1B, respectively, are rubbed in the same direction, in other words, the directions of the initial orientations of the orientation films 7 and 11 are parallel with each other.

In the area formed with the spacer 10, the orientation film 11 formed on the top of the spacer 10 contacts the orientation film 7 formed on the filter substrate 1A, and it was confirmed that adhesion at the contact area is increased.

Figure 2:
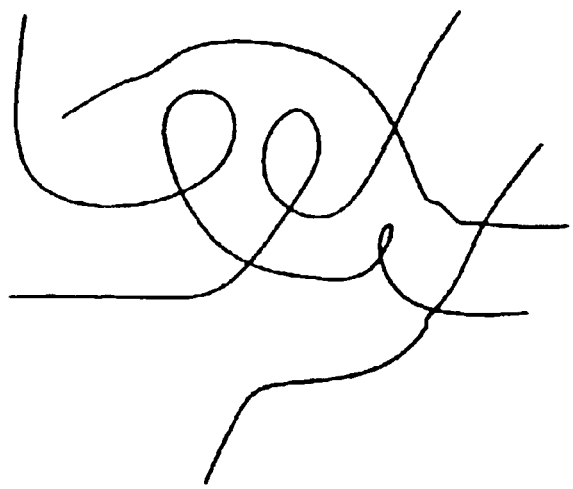
FIG. 2 is an illustration of an arrangement of main chains in an example of liquid crystal orientation film used in a liquid crystal display device of the present invention before being subjected to a rubbing treatment.
Figure 3:
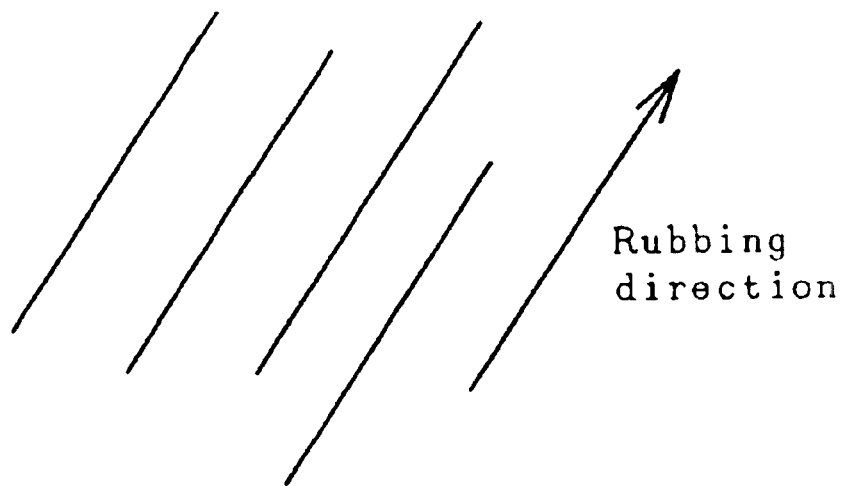
FIG. 3 is an illustration of an arrangement of main chains in the example of the liquid crystal orientation film of FIG. 2 after having been subjected to a rubbing treatment.

In the synthetic resin film before being rubbed, main chains of the material are randomly arranged as illustrated in FIG. 2, for example, but in the synthetic resin film rubbed in the direction as described, main chains of the material are arranged in one direction and consequently, the orientation films 7, 11 are bonded together firmly by the intermolecular force.

It was experimentally confirmed that, when benzene rings are contained in the structure of molecules of the orientation film, the above-mentioned adhesion at the contact area is further increased.

It was also confirmed that the above-mentioned adhesion at the contact area is still further increased when a material having a greater number of main chains than that of side chains is chosen for the orientation film.

Materials satisfying this condition for the orientation film are as follows:

The orientation film is composed of a polyimide resin film of 50 nm in thickness and made from 2,2-bis[4-(p-aminophenoxy) phenylpropane] and pyromellitic dianhydride, for example.

For other materials for the orientation film, amines to be copolymerized with tetracarboxylic acid dianhydride are as follows:

phenylene diamime, diphenylene diamine, triphenylene diamine, a compound represented by the formula below,

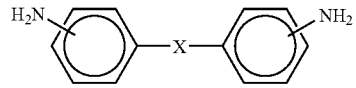

where X denotes a direct coupling, —O—, —CH$_2$—, —SO$_2$—, —CO—, —CO$_2$—, or —CONH—, or compounds having a structure represented by one of the formulas below,

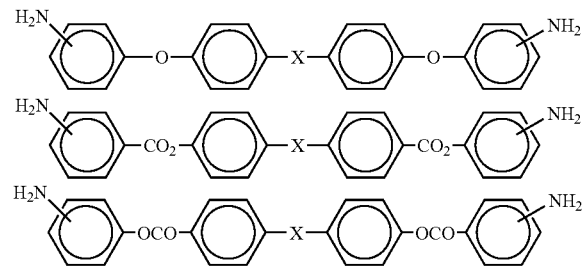

where X denotes a direct coupling, a compound of bis (aminophenoxy)diphenyl, for example.

The following are specific examples: p-phenylenediamine, m-phenylenediamine, 4,4'-diaminoterphenyl, 4,4'-diaminodiphenylsulfone, 3,3'-diaminodiphenylsulfone, 4,4'-diaminodiphenylbenzoate, 4,4'-diaminodiphenylmethane, 2,2'-(4,4'-diaminodiphenyl) propane, 4,4'-bis (p-aminophenoxy) diphenylsulfone, 4,4'-bis(m-aminophenoxy)diphenylsulfone, 4,4'-bis(p-aminophenoxy)diphenylether, 4,4'-bis(P-aminophenoxy) diphenylketone, 4,4'-bis(P-aminophenoxy) diphenylmethane, 2,2'-[4,4'-bis(p-aminophenoxy)diphenyl] propane.

Also 4,4'-diamino-3-carbamoyldiphenylether represented by the formula below,

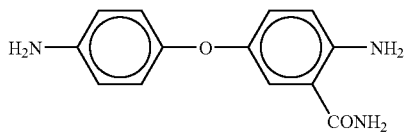

or diaminopolysiloxane represented by the formulas below,

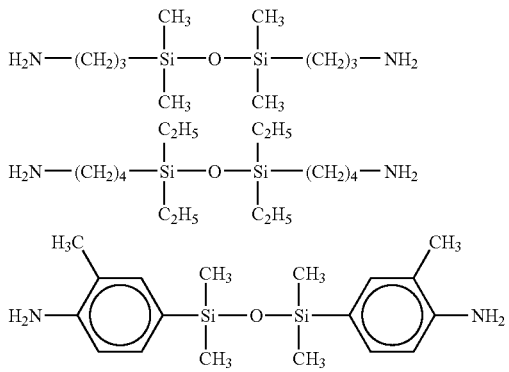

can be used.

The exemplary diamines to be copolymerized with tetracarboxylic acid dianhydride, but not containg halogen radicals are as follows:

4,4'-diaminodiphenylether-3-carbonamide, 3-3'-diaminodiphenylsulfone, 3-3'dimethyl 4-4'diaminodiphenylether, 1,6-diaminohexane, 2-2'-bis[4-(4-aminophenoxy)diphenyl]propane, 2-2'-bis[4-(4-aminophenoxy)phenyl]methane, 2-2'-bis[4-(4-aminophenoxy)phenyl]sulfone, 2-2'-bis[4-(4-aminophenoxy)phenyl]ketone, 2-2'-bis[4-(4-aminophenoxy)phenyl]biphenyl, 2-2'-bis[4-(4-aminophenoxy)phenyl]cyclohexane, 2-2'-bis[4-(4-aminophenoxy)phenyl]methylcyclohexane, bis[4-(4-aminobenzoyloxy)benzoic]propane, bis[4-(4-aminobenzoyloxy)benzoic]cyclohexane, bis[4-(4-aminobenzoyloxy)benzoic]methylcyclohexane, bis[4-(4-aminomethylbenzoyloxy)benzoic]propane, bis(4-aminobenzoyloxy)propane, bis(4-aminobenzoyloxy) methane, bis[2-(4-aminophenoxy)phenyl]methane, bis [2-(4-aminophenoxy)-3,5-dimethylphenyl]methane, bis[2-(4-aminophenoxy)-3,4,5-trimethylphenyl] methane, bis[2-(4-aminophenoxy)-3,5,6-trimethylphenyl]methane, bis[2-(4-aminophenoxy)-3,5-diethylphenyl]methane, bis[2-(4-aminophenoxy)-5-n-propylphenyl]methane, bis[2-(4-aminophenoxy)-5-isopropylphenyl]methane, bis[2-(4-aminophenoxy)-5-methyl 3-isopropylphenyl]meethane, bis[2-(4-aminophenoxy)-5-n-butylphenyl]methane, bis[2-(4-aminophenoxy)-5-isobutylphenyl]methane, bis[2-(4-aminophenoxy)-3-methyl 5-t-butylphenyl]methane, bis[2-(4-aminophenoxy)-5-cyclohexylphenyl]methane, bis[2-(4-aminophenoxy)-3-methyl-5-cyclohexylphenyl]methane, bis[2-(4-aminophenoxy)-5-methyl-3-cyclohexylphenyl]methane, bis[2-(4-aminophenoxy)-5-phenylphenyl]methane, bis[2-(4-aminophenoxy)-3-methyl-5-phenylphenyl]methane, 1,1-bis[2-(4-aminophenoxy)-5-methylphenyl]methane, 1,1-bis[2-(4-aminophenoxy)-5-dimethylphenyl]ethane, 1,1-bis[2-(4-aminophenoxy)-5-methylphenyl]propane, 1,1-bis[2-(4-aminophenoxy)-3,5-dimethylphenyl] propane, 2,2-bis[2-(4-aminophenoxy)phenyl]propane, 2,2-bis[2-(4-aminophenoxy)-3,5-dimethylphenyl] propane, 1,1-bis[2-(4-aminophenoxy)-5-methylphenyl]butane, 2,2-bis[2-(4-aminophenoxy)-3, 5-dimethylphenyl]butane, 1,1-bis[2-(4-aminophenoxy)-5-methylphenyl]-3-methylpropane, 1,1-bis[2-(4-aminophenoxy)-3,5-dimethylphenyl] cyclohexane, and 1,1-bis[2-(4-aminophenoxy)-5-methylphenyl]-3-3-5-trimethylcyclohexane, and diaminosiloxane can be copolymerized.

But the materials are not limited to the above.

The examples of acid compounds having a long-chain alkylene radical and other copolymerizable compounds are as follows: octylsuccinic dianhydride, dodecylsuccinic dianhydride, octylmalonic dianhydride, decamethylenebistribenzenehexacarboxylic dianhydride, decamethylenebist-rimethylenebistribenzenehexacarboxylic dianhydride, 2,2-bis[4-(3,4-dicarboxyphenoxy)phenyl]octyltetracarboxylic dianhydride, 2,2-bis[4-(3,4-dicarboxybenzoyloxy)phenyl] tridecanetetracarboxylic dianhydride, 2,2-bis[4-(3,4-dicarboxyphenoxy)phenyl]tridecanetetracarboxylic dianhydride, stearic acid, stearylchloride, pyromellitic dianhydride, methylpyromellitic dianhydride, 3,3',4,4'-biphenyltetracarboxylic dianhydride, dimethylenetribenzenehexacarboxylic dianhydride, 3,3',4,4'-biscyclohexanetetracarboxylic dianhydride, 3,3',4,4'-benzophenonetetracarboxylic dianhydride, 3,3',4,4'-diphenylmethanetetracarboxylic dianhydride, 3,3',4,4'-diphenylethertetracarboxylic dianhydride, 3,3',4,4'-diphenylsulfonetetracarboxylic dianhydride, 2,3,6,7-naphtalenetetracarboxylic dianhydride, 3,3',4,4'-diphenylpropanetetracarboxylic dianhydreide, 2,2- bis[4-(3, 4-dicarboxyphenoxy)phenyl]propanetetracarboxylic dianhydride, 2,2-bis[4-(3,4-dicarboxyphenoxy)phenyl] hexafluoropropanetetracarboxylic dianhydride, 2,2-bis[4-(3, 4-dicarboxybenzoyloxy)phenyl]propanetetracarboxylic dianhydreide, cyclopentanetetracarboxylic dianhydride, 1,2, 3,4-cyclobutanetetracarboxylic dianhydride, bicyclo(2,2,2) octa-7-ene-2,3,5,6-tetracarboxylic dianhydride, 1,2,3,4-cyclopentanetetracarboxylic dianhydride, and 1,2,3,4-butanetetracarboxylic dianhydride.

Embodiment 3

Figure 4A:
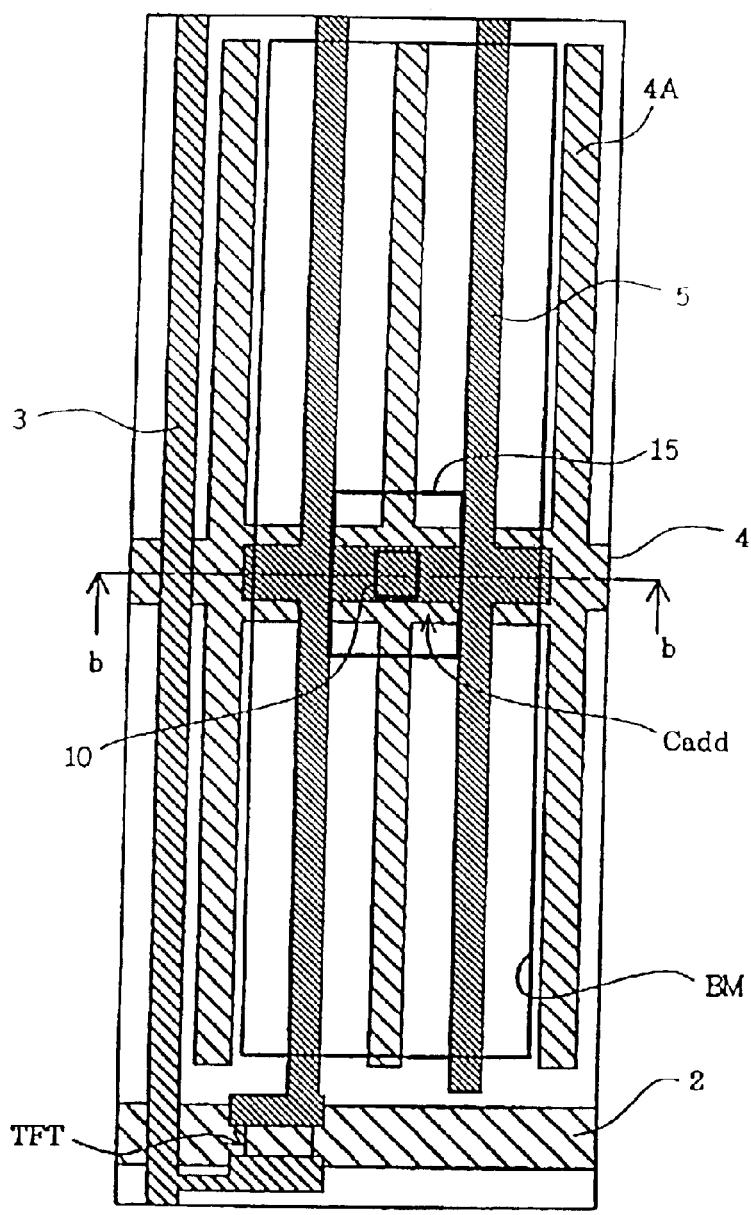
FIG. 4A is a plan view of a pixel in a liquid crystal display device in accordance with still another embodiment of the present invention.
Figure 4B:
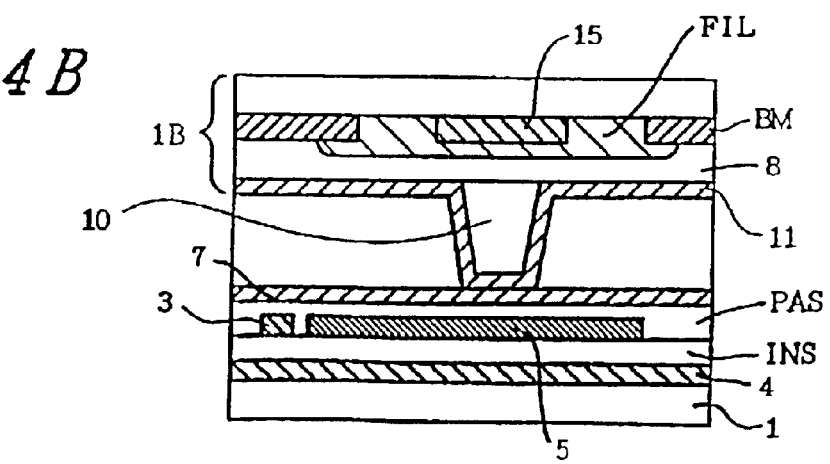
FIG. 4B is a cross-sectional view of the pixel taken along line b—b of FIG. 4A.

FIGS. 4A and 4B illustrate a configuration of another embodiment of the liquid crystal display device according to the present invention. FIG. 4A is a plan view of one of a plurality of pixels in a liquid crystal display device of the so-called horizontal electric field type, FIG. 4B is a cross-sectional view of the pixel of FIG. 1A taken along line b—b of FIG. 4A.

The pixels as illustrated in FIGS. 4A and 4B are arranged in the form of a matrix to constitute a display area.

The embodiment illustrated in FIGS. 4A and 4B is similar to the embodiment illustrated in FIGS. 1A and 1B, except that a light-blocking film 15 made of the same material as the black matrix BM and having an area larger than the spacer 10 is formed below and centered on the spacer 10 on the filter substrate 1B.

In connection with the embodiment illustrated in FIGS. 1A and 1B, it was explained that the orientation defects of the orientation film 11 caused by the spacer 10 can be masked by the counter-voltage signal line 4, but there may be some cases in which it is impossible to predict what is the area where the orientation defects occur, and therefore the object of this embodiment is to ensure the masking effect of the light-blocking film 15 by enlarging the masking area around the spacer 10 without producing adverse effects on the aperture ratio of the pixel.

In the configuration of this embodiment, the light-blocking film 15 can be formed simultaneously with the formation of the black matrix BM, and consequently, it is advantageous that no additional manufacturing is needed.

But it is needless to say that the light-blocking film 15 does not need to be formed of the same material as the black matrix BM.

Embodiment 4

Figure 5:
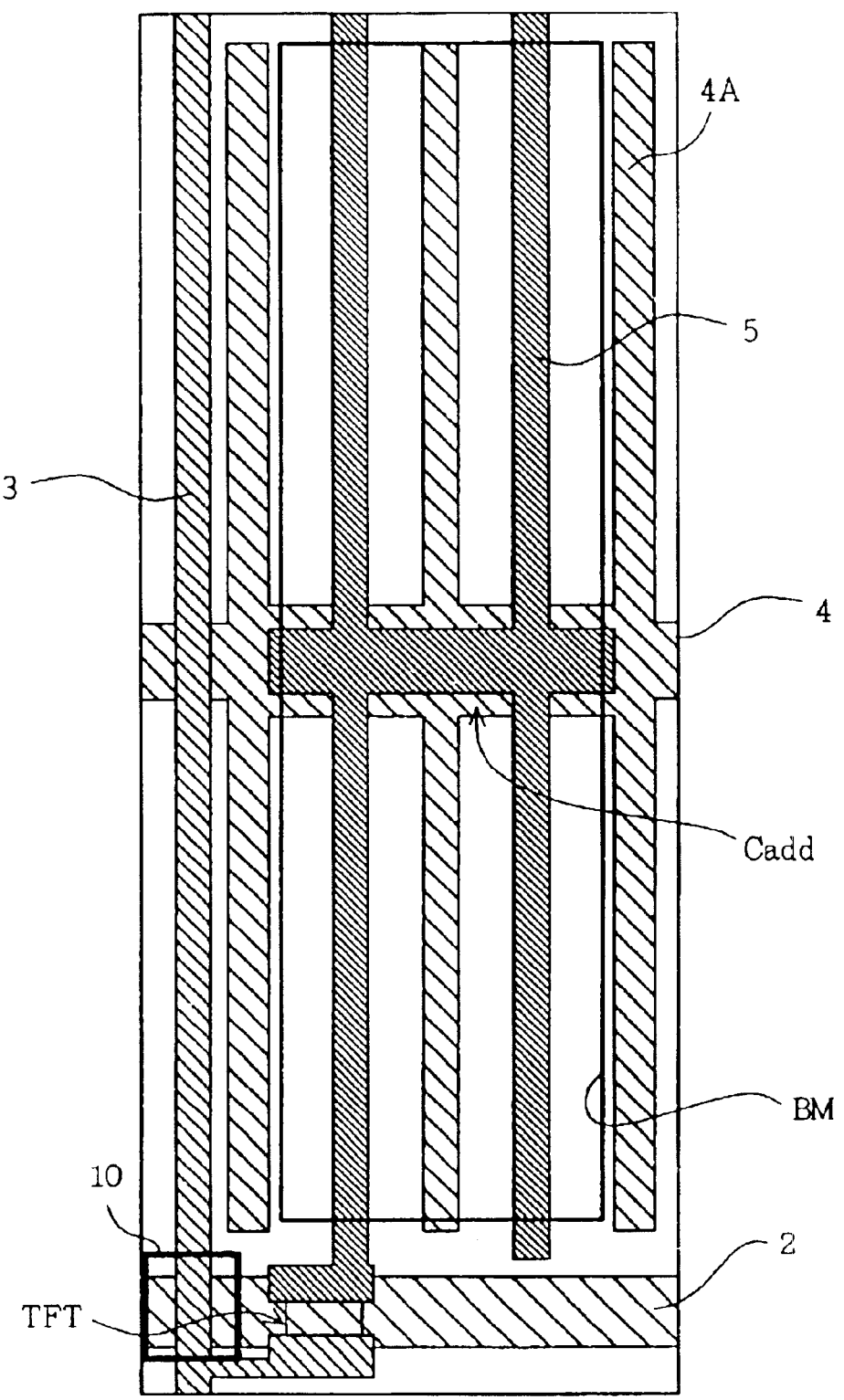
FIG. 5 is a plan view of a pixel in a liquid crystal display device in accordance with still another embodiment of the present invention.

FIG. 5 illustrates a configuration of another embodiment of the liquid crystal display device according to the present invention, and is a plan view of one of a plurality of pixels in a liquid crystal display device of the so-called horizontal electric field type corresponding to FIG. 1A.

The embodiment illustrated in FIG. 5 is similar to the embodiment illustrated in FIGS. 1A and 1B, except that the spacer 10 is located at the intersection of the gate line 2 and the drain line 3 to cover the intersection. The reason why the spacer 10 is located at the intersection of the gate line 2 and the drain line 3 is that the liquid crystal material is prevented from being present at the intersection so that metal components of the drain line 3 is prevented from being dissolved into the liquid crystal material due to electrochemical reaction with the liquid crystal material serving as an electrolyte.

Figure 6A:
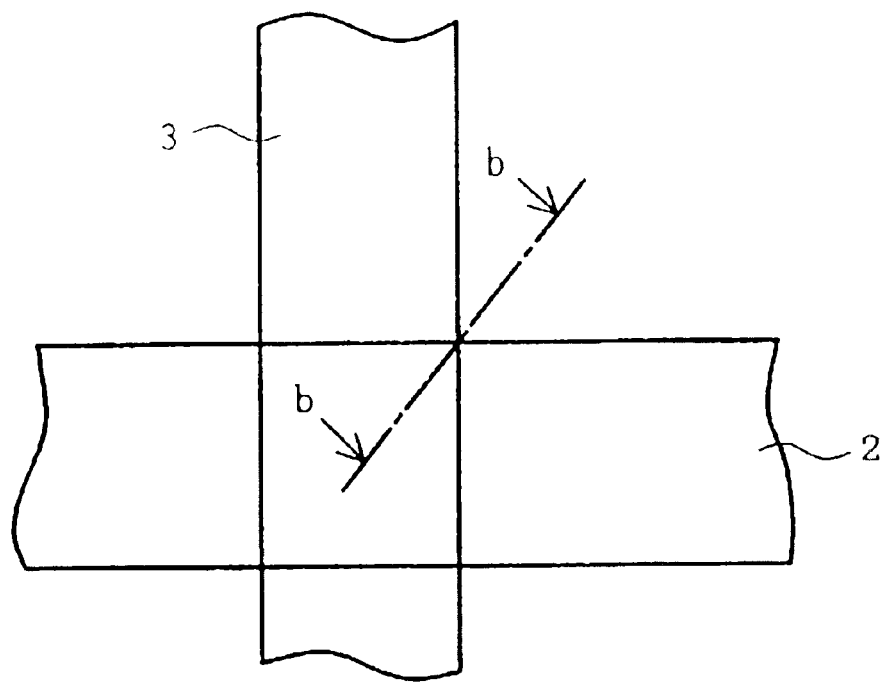
FIG. 6A is a plan view of an intersection of a gate line and a drain line with an insulating film interposed therebetween for explaining a problem with the intersection.
Figure 6B:
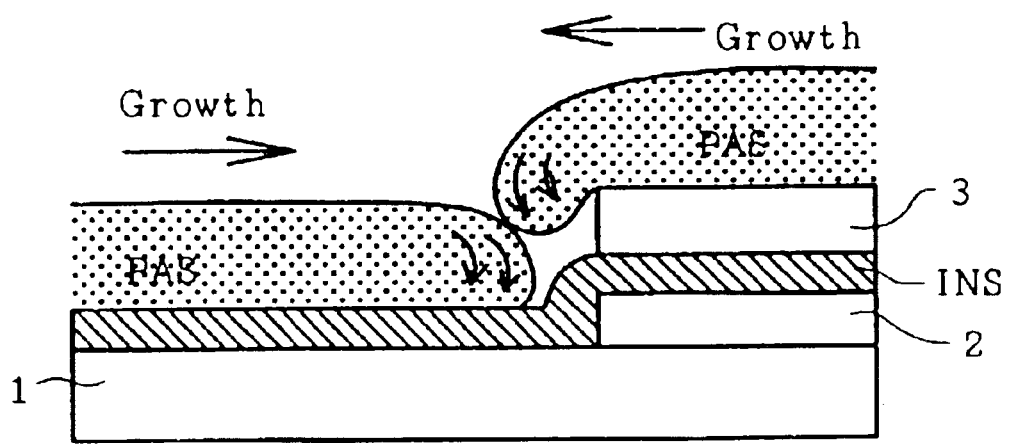
FIG. 6B is a cross-sectional view of the intersection taken along line b—b of FIG. 6A.

FIG. 6A is a plan view of the intersection of the gate line 2 and the drain line 3 with the insulating film INS interposed therebetween, and FIG. 6B is a cross-sectional view of the intersection taken along line b—b of FIG. 6A.

In FIG. 6B, in forming the protective film PAS over the intersection, the growth of the protective film PAS from over the top of the intersection interferes with that of the protective film PAS on the insulating film INS at the intersection of the edges of long sides of the gate line 2 and the drain line 3 (i.e. at corners of the intersection), the protective film PAS cannot cover the intersection sufficiently, and consequently, the liquid crystal material sometimes penetrates into the intersection and contacts the drain line 3 on the insulating film INS. In such a case, it is inevitable that metal components of the drain line 3 dissolve into the liquid crystal material by the so-called galvanic corrosion.

It is for this reason that the spacer 10 is disposed so as to cover the intersection of the gate line 2 and the drain line 3 and prevent penetration of the liquid crystal material into the intersection in this embodiment.

Considering the above-mentioned purpose of this embodiment, it is not always necessary to cover the entire surface of the intersection, but it is sufficient to dispose the spacer 10 so as to cover at least the intersection of the edges of long sides of the gate line 2 and the drain line 3.

Embodiment 5

Figure 7:
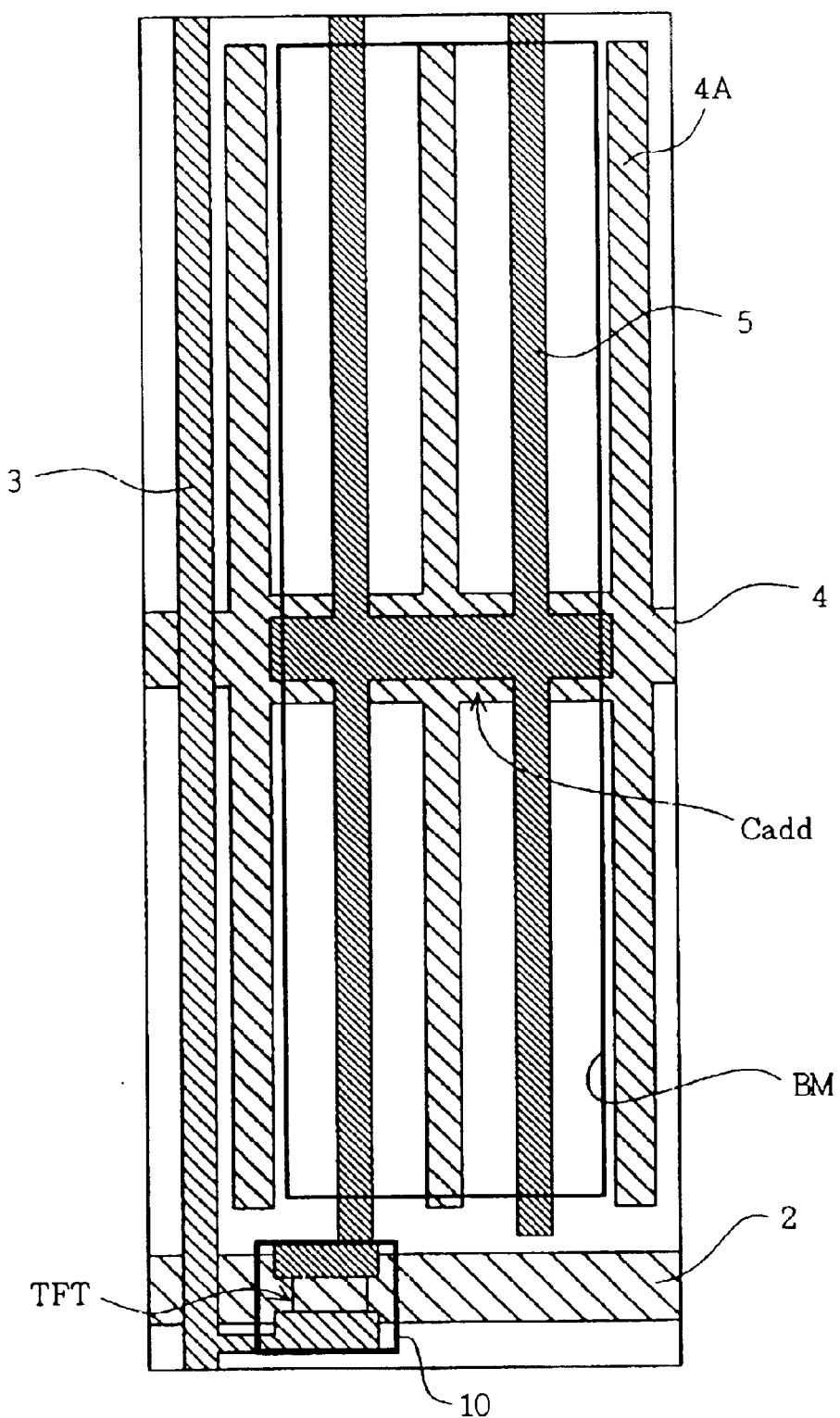
FIG. 7 is a plan view of a pixel in a liquid crystal display device in accordance with still another embodiment of the present invention.

FIG. 7 illustrates a configuration of another embodiment of the liquid crystal display device according to the present invention, and is a plan view of one of a plurality of pixels in a liquid crystal display device of the so-called horizontal electric field type corresponding to FIG. 1A.

The embodiment illustrated in FIG. 7 is similar to the embodiment illustrated in FIG. 5, except that the spacer 10 is located at an area where the thin film transistor TFT is formed to cover the thin film transistor TFT.

In this embodiment, the spacer 10 covers the thin film transistor TFT such that at least corners of the drain electrode 3A or the source electrode 5A of the thin film transistor TFT.

Figure 8A:
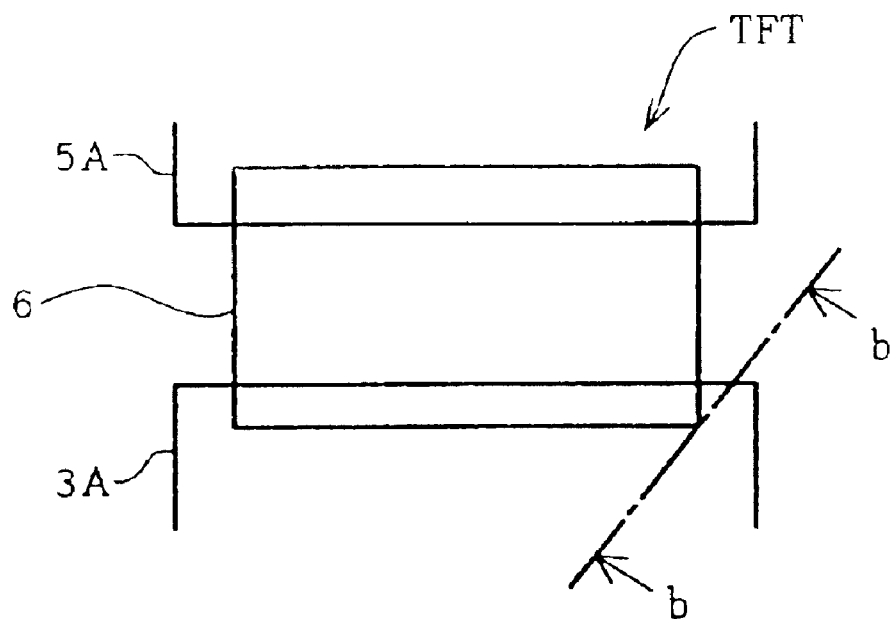
FIG. 8A is a plan view of a thin film transistor for explaining a problem with the thin film transistor.
Figure 8B:
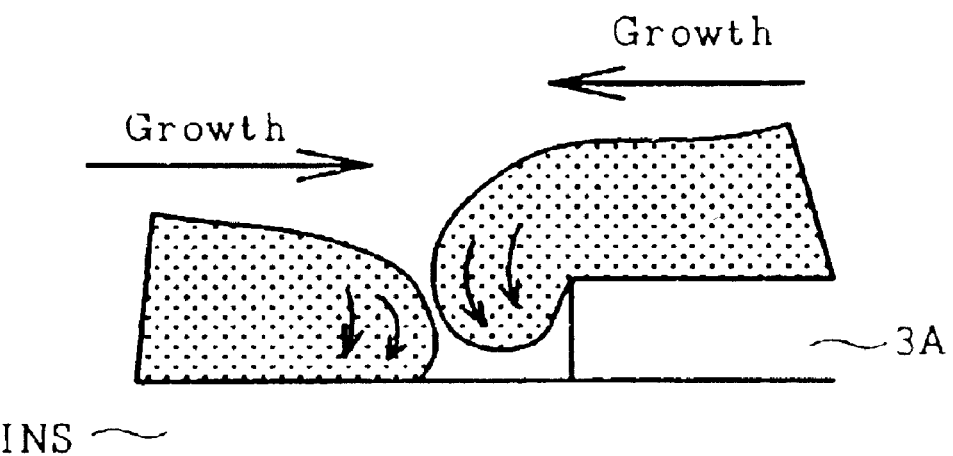
FIG. 8B is a cross-sectional view of the thin film transistor taken along line b—b of FIG. 8A.

FIG. 8A is a plan view of the thin film transistor TFT, and FIG. 8B is a cross-sectional view of the thin film transistor TFT taken along line b—b of FIG. 8A.

In FIG. 8B, in forming the protective film PAS over the top surface of the drain electrode 3A, the growth of the protective film PAS from over the top surface of the drain electrode 3A interferes with that of the protective film PAS on the insulating film INS at the corners of the drain electrode 3A, the protective film PAS cannot cover the corners sufficiently, and consequently, the liquid crystal material sometimes penetrates into the corners and contacts the drain electrode 3A. In such a case, it is inevitable that metal components of the drain electrode 3A dissolve into the liquid crystal material by the so-called galvanic corrosion.

The galvanic corrosion of the drain electrode 3A or the source electrode 5A changes the width of the channel of the thin film transistor TFT, and consequently, it is very advantageous that the galvanic corrosion can be prevented.

Incidentally, the semiconductor layer 6 forming the thin film transistor TFT can be considered as a conductive layer, and it may have a problem with the gate line 2 similar to the problem explained in Embodiment 4, and consequently, it is very effective to dispose the spacer 10 to cover the area where the thin film transistor TFT is formed.

Embodiment 6

Figure 9:
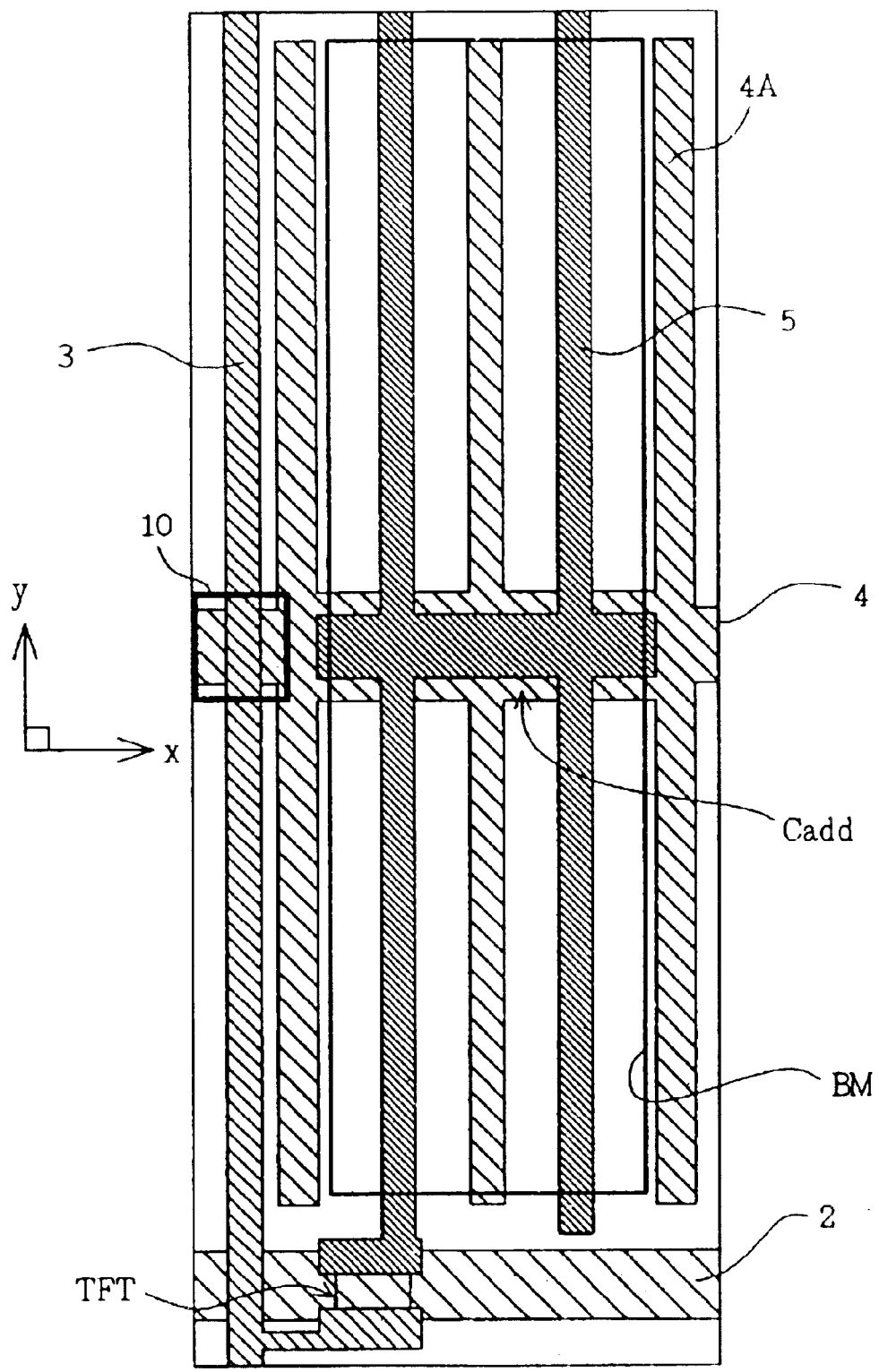
FIG. 9 is a plan view of a pixel in a liquid crystal display device in accordance with still another embodiment of the present invention.

FIG. 9 illustrates a configuration of another embodiment of the liquid crystal display device according to the present invention, and is a plan view of one of a plurality of pixels in a liquid crystal display device of the so-called horizontal electric field type corresponding to FIG. 1A.

The embodiment illustrated in FIG. 9 is similar to the embodiment illustrated in FIG. 5, except that the spacer 10 is located at the intersection of the counter-voltage signal line 4 and the drain line 3 to cover the intersection.

The liquid crystal display device having this configuration prevents the galvanic corrosion of the drain line 3 for the reason similar to that in Embodiment 4.

This embodiment also provides an advantage of facilitating the control of the thickness of the liquid crystal layer (the spacing between the two substrates) at the pixel because the spacer 10 is positioned approximately at the center of the dimension of the pixel in the y direction.

Embodiment 7

Figure 10:
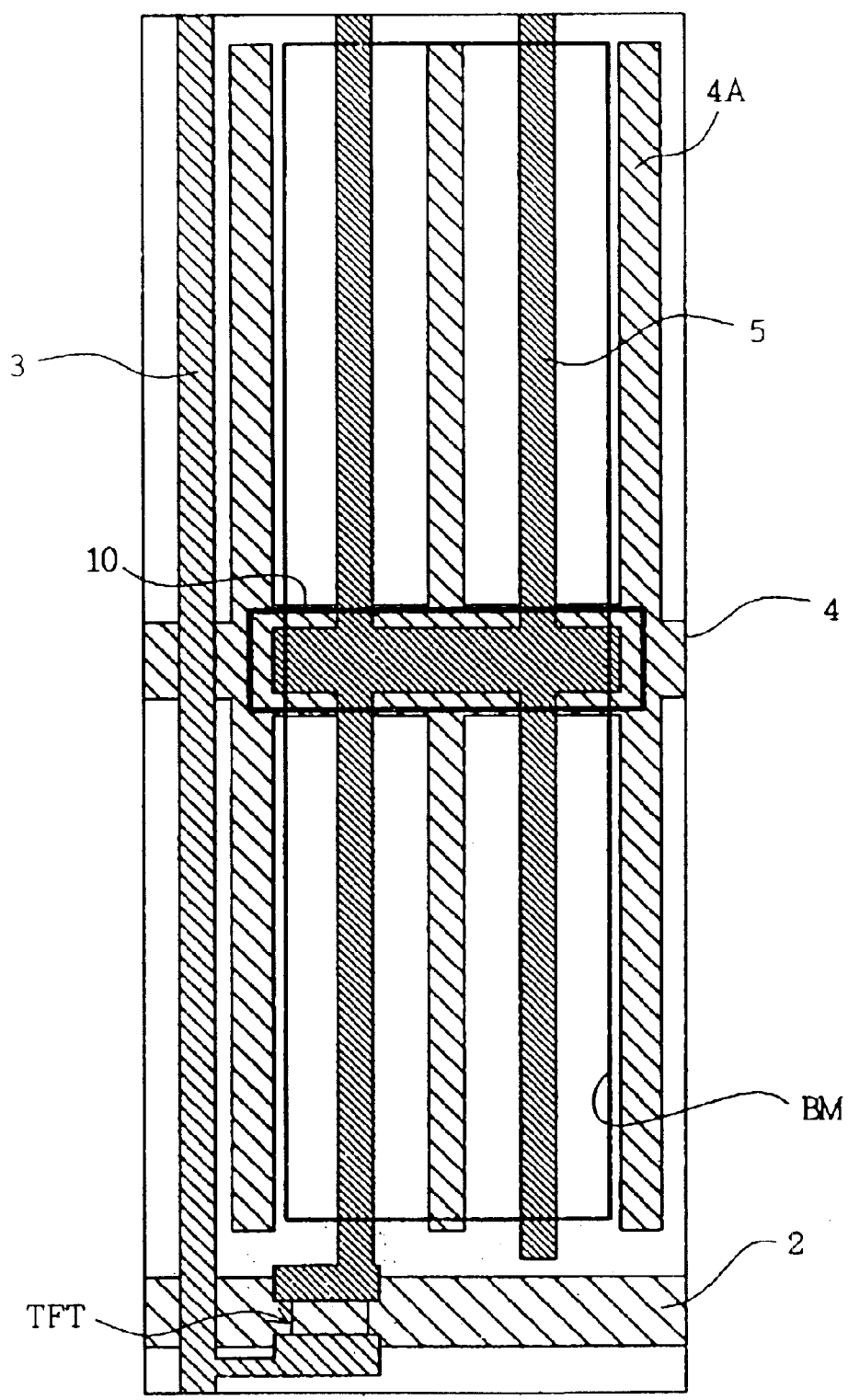
FIG. 10 is a plan view of a pixel in a liquid crystal display device in accordance with still another embodiment of the present invention.

FIG. 10 illustrates a configuration of another embodiment of the liquid crystal display device according to the present invention, and is a plan view of one of a plurality of pixels in a liquid crystal display device of the so-called horizontal electric field type corresponding to FIG. 1A.

The embodiment illustrated in FIG. 10 is similar to the embodiment illustrated in FIG. 5, except that the spacer 10 is formed to cover one of two electrodes forming a capacitor Cadd (an electrode extending integrally from the counter electrode 4), and thereby the area of the spacer 10 is made comparatively large.

The liquid crystal display device having this configuration prevents the galvanic corrosion of the covered electrode by the liquid crystal material as in the case of FIG. 9.

This embodiment can increase the area of the spacer 10 without no reduction in the aperture ratio of the pixel, and improve reliability of the spacer.

This embodiment also provides an advantage of facilitating the control of the thickness of the liquid crystal layer (the spacing between the two transparent substrates) at the pixel because the spacer 10 is positioned approximately at the center of the dimension of the pixel in the y direction.

Embodiment 8

Figure 11A:
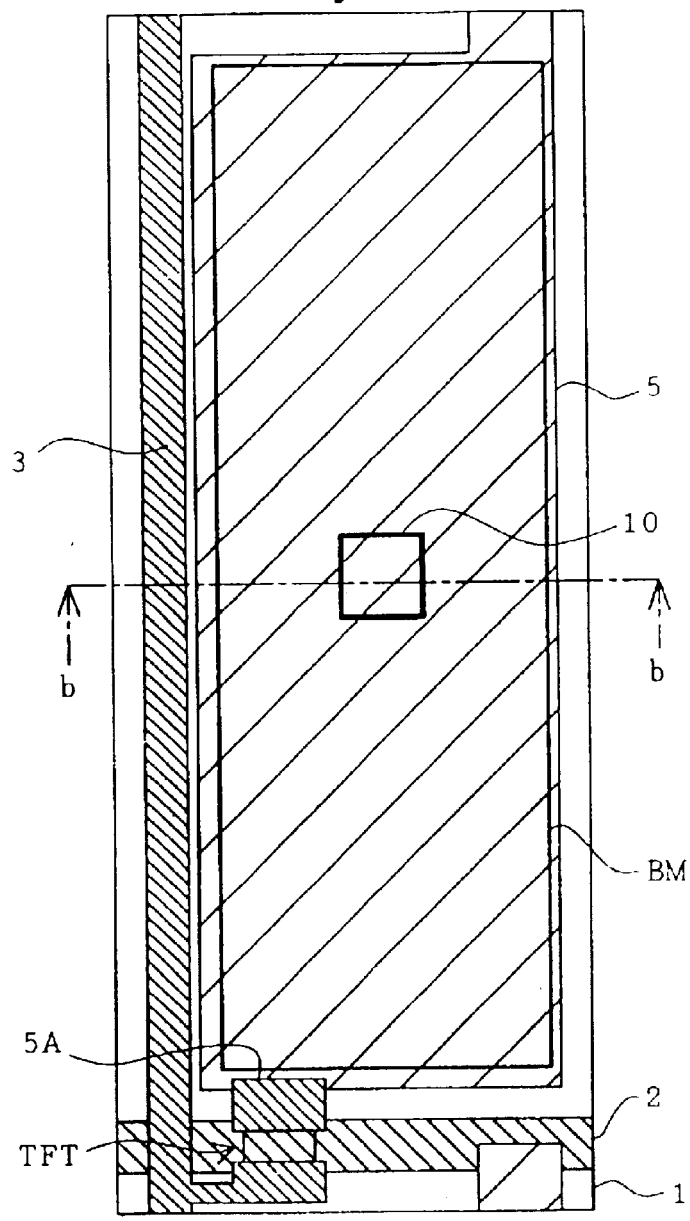
FIG. 11A is a plan view of a pixel in a liquid crystal display device in accordance with still another embodiment of the present invention.
Figure 11B:
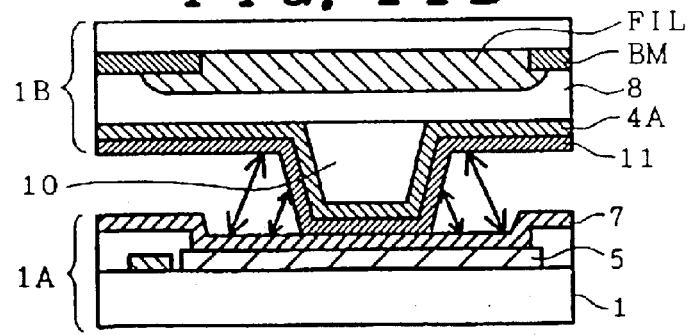
FIG. 11B is a cross-sectional view of the pixel taken along line b—b of FIG. 11A.

FIGS. 11A and 11B illustrate a configuration of another embodiment of the liquid crystal display device according to the present invention. FIG. 11A is a plan view of one of a plurality of pixels in a liquid crystal display device of the so-called vertical electric field type such as the twisted nematic type, FIG. 11B is a cross-sectional view of the pixel of FIG. 11A taken along line b—b of FIG. 11A. The pixels as illustrated in FIGS. 11A and 11B are arranged in the form of a matrix to constitute a display area.

In a liquid crystal display device of the vertical electric field type (commonly called the twisted nematic type), the transmission of light at each pixel is controlled by a vertical electric field applied across a layer of liquid crystal material sandwiched between opposing transparent electrodes formed on the inner surfaces of the opposing transparent substrates. Each pixel is formed by two electrodes formed on a pair of opposing substrates, respectively. For the purpose of device construction and operation, U.S. Pat. No. 3,918,796, issued to Fergason on Nov. 11, 1975, is hereby incorporated by reference.

In the liquid crystal display device of the vertical field type, the configurations of the gate lines 2, the drain lines 3 and the thin film transistors TFT are approximately similar to those in the above-explained liquid crystal display device of the horizontal electric field type. The differences are that, in the liquid crystal display device of the vertical electric field type, the pixel electrodes 5 connected to the source electrode of the respective thin film transistors TFT are transparent films made of ITO (Indium-Tin-Oxide), for example, and are formed over the entire areas serving as the effective pixel areas (at least areas surrounded by the black matrix BM).

The counter electrode 4A is formed on the filter substrate 1B to oppose the pixel electrodes 5 in common (sometimes called a common electrode for this relationship) and is made of ITO, for example.

Light transmission through the liquid crystal layer is controlled by electric fields generated in a direction approximately perpendicular to the electrodes 5, 4A sandwiching the liquid crystal layer, and this is the reason why the liquid crystal display device of this type is called a liquid crystal display device of the vertical field type.

In this embodiment, the spacer 10 is formed on the filter substrate 1B so as to oppose approximately the center of the pixel electrode 5.

As shown in FIG. 11B, the spacer 10 is formed on the planarizing film 8 by shaping the synthetic resin film coated on the planarizing film 8 using a photolithographic technique (and also by selective etching, if necessary) such that a truncated quadrilateral pyramid is left on the planarizing film 8.

The counter electrode 4A and the orientation film 11 are coated on the planarizing film 8 including the spacer 10 sequentially. The orientation film 11 formed on the side wall of the spacer 10 is not parallel with the orientation film 7 formed on the TFT substrate 1A.

In other words, the configuration is such that, in the majority of the pixel area, electric fields are generated perpendicularly to the major surfaces of the substrates, but in the vicinity of the spacer 10 electric fields are generated in a direction at an angle from the normal to the major surfaces as shown in FIG. 11B, and this provides the above-explained multi-domain effect.

This multi-domain effect eliminates the problem that the reversal in transmitted light intensity through the liquid crystal layer occurs at viewing angles deviating considerably from the main anticipated viewing angle of the liquid crystal panel due to the angular dependence of the electro-optic characteristics of the liquid crystal layer.

This advantage is obtained by forming the spacer 10 within the effective pixel area (an area surrounded by the black matrix BM) without the need for increasing the number of the manufacturing steps.

In this embodiment, one spacer is disposed in each pixel, but the present invention is not limited to this arrangement.

Figure 12A:
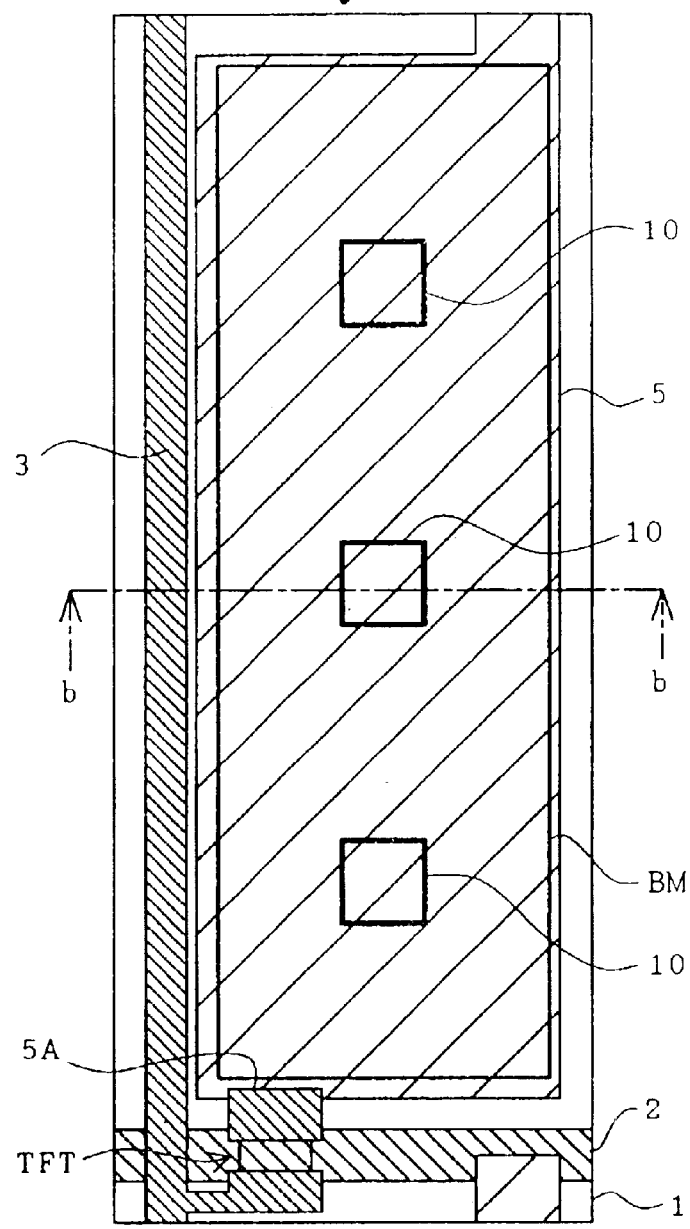
FIG. 12A is a plan view of a pixel in a liquid crystal display device in accordance with still another embodiment of the present invention.
Figure 12B:
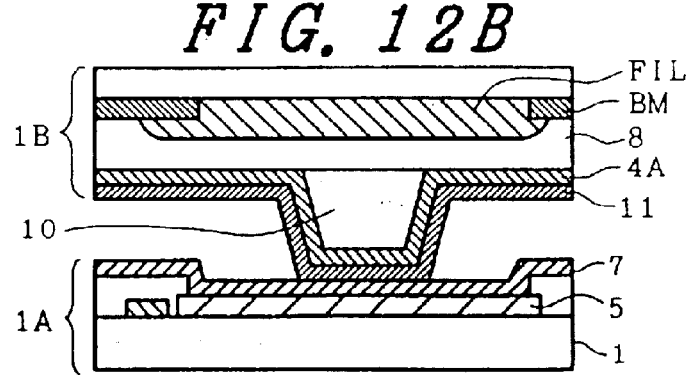
FIG. 12B is a cross-sectional view of the pixel taken along line b—b of FIG. 12A.

As shown in FIGS. 12A and 12B corresponding to FIGS. 11A and 11B, respectively, the present invention can be configured such that three spacers 10 are arranged along the long sides of the pixel.

The above advantage is further improved by employing liquid crystal material of negative dielectric anisotropy.

Embodiment 9

Figure 13A:
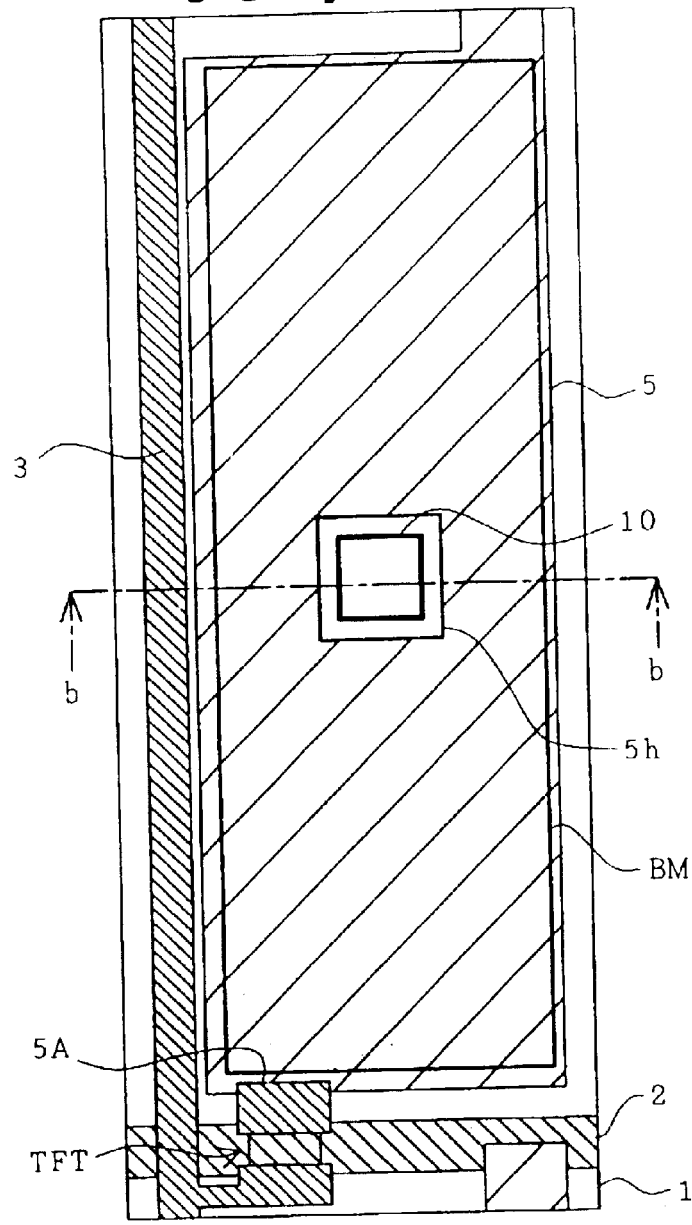
FIG. 13A is a plan view of a pixel in a liquid crystal display device in accordance with still another embodiment of the present invention.
Figure 13B:
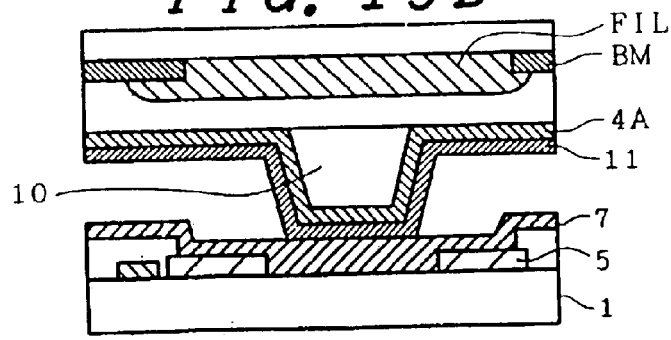
FIG. 13B is a cross-sectional view of the pixel taken along line b—b of FIG. 13A.

FIGS. 13A and 13B illustrate a configuration of another embodiment of the liquid crystal display device according to the present invention. FIG. 13A is a plan view of one of a plurality of pixels in a liquid crystal display device of the so-called vertical electric field type such as the twisted nematic type, FIG. 13B is a cross-sectional view of the pixel of FIG. 13A taken along line b—b of FIG. 13A. FIGS. 13A and 13B correspond to FIGS. 11A and 11B, respectively.

The embodiment illustrated in FIGS. 13A and 13B is similar to the embodiment illustrated in FIGS. 11A and 11B, except that the pixel electrode 5 formed on the substrate opposing the substrate having the spacer 10 formed thereon is formed with an opening 5h facing the spacer 10.

The opening 5h in the pixel electrode 5 is centered on the top surface of the spacer 10 and is larger in area than the top surface of the spacer 10. This configuration prevents unexpected short circuit between the pixel electrode 5 and the counter electrode 4A occurring even if the orientation films 11, 7 are interposed therebetween.

This means that it is sufficient that the pixel electrode 5 is configured so as to be absent at an area facing the spacer 10, and therefore the configuration of the present invention is not limited to the opening, but the configuration such as a cutout can also be employed. The similar configurations can be employed even if a plurality of spacers 10 are arranged in a pixel.

Figure 14A:
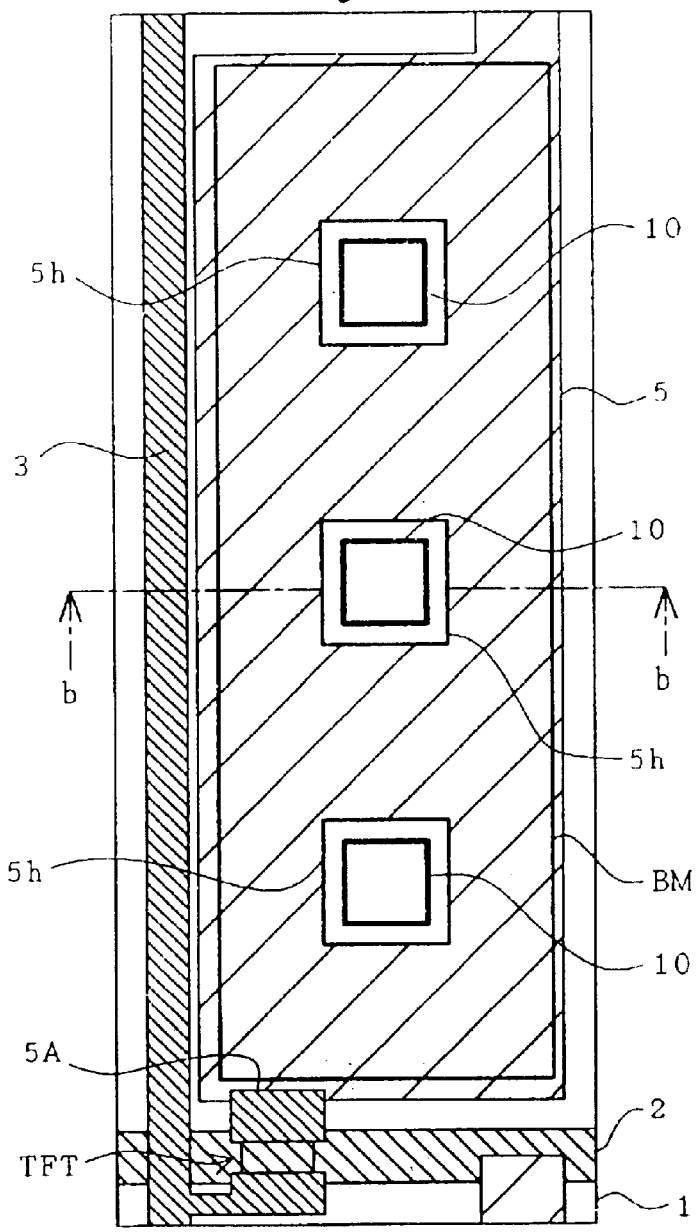
FIG. 14A is a plan view of a pixel in a liquid crystal display device in accordance with still another embodiment of the present invention.
Figure 14B:
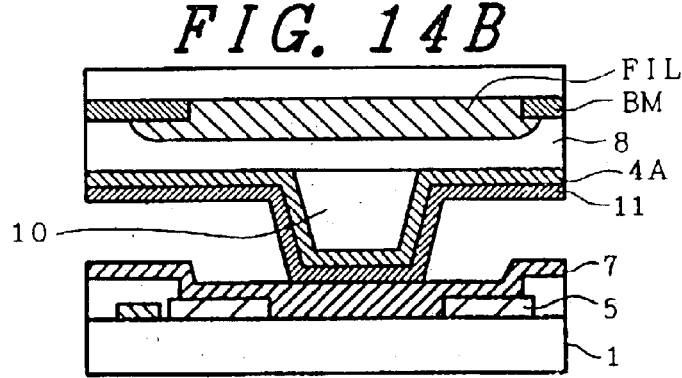
FIG. 14B is a cross-sectional view of the pixel taken along line b—b of FIG. 14A.

For example, as shown in FIGS. 14A and 14B corresponding to FIGS. 12A and 12B, respectively, three openings are provided in three portions facing the three spacers 10, respectively, of the pixel electrode 5.

Embodiment 10

Figure 15:
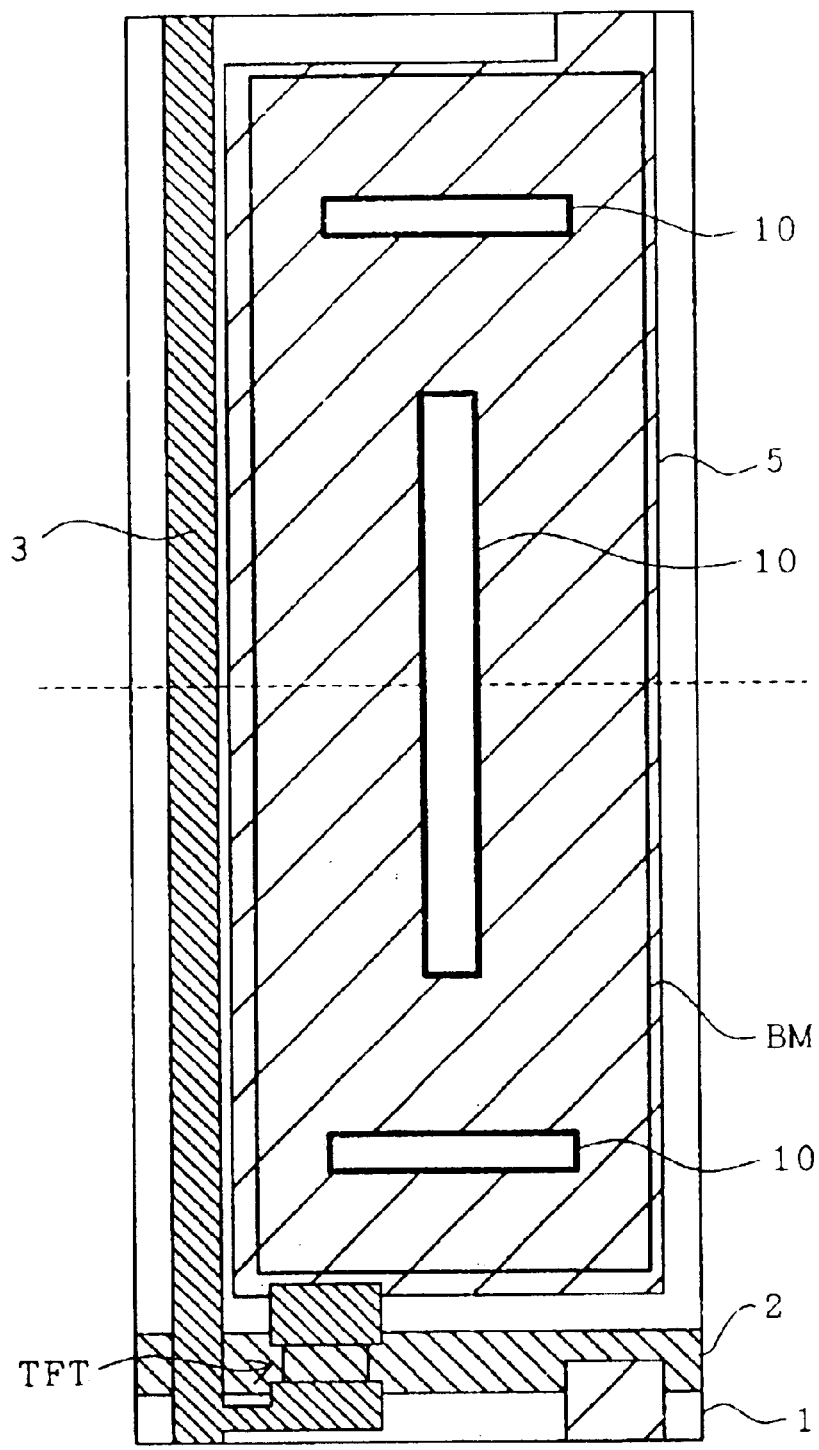
FIG. 15 is a plan view of a pixel in a liquid crystal display device in accordance with still another embodiment of the present invention.

FIG. 15 illustrates a configuration of another embodiment of the liquid crystal display device according to the present invention, and is a plan view of one of a plurality of pixels in a liquid crystal display device of the so-called vertical electric field type such as the twisted nematic type.

This embodiment aims at heightening the multi-domain effect, and the spacer formed within one pixel area is configured so as to have a portion extending along the long sides of the pixel area and portions extending along the short sides of the pixel area. The spacer of this configuration has the shape extending along respective directions, and thereby increases the area capable of producing the multi-domain effect and heightens the multi-domain effect.

Figure 16:
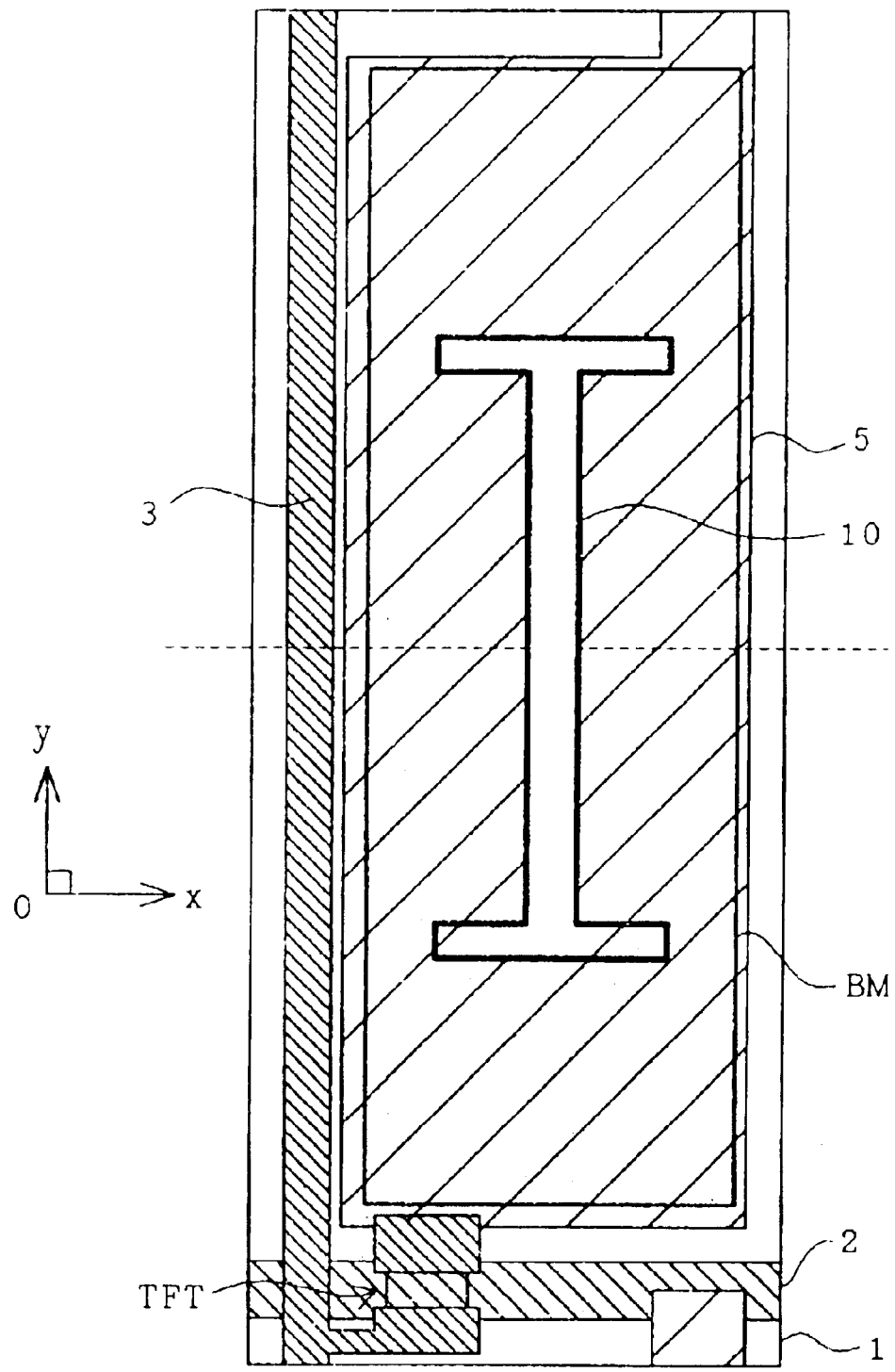
FIG. 16 is a plan view of a pixel in a liquid crystal display device in accordance with still another embodiment of the present invention.

In this embodiment, as shown in FIGS. 15 and 16, in each of two regions obtained by subdividing the pixel area in horizontal and vertical directions, the spacer is shaped to be symmetrical so that the regions for producing the multi-domain effect are distributed uniformly over the entire pixel, and consequently, the quality of displayed images can be improved.

Incidentally, it is sometimes sufficient that, instead of subdividing the pixel area both in horizontal and vertical directions, in each of two regions obtained by subdividing the pixel area in a horizontal or vertical direction, the spacer is shaped to be symmetrical.

By extending the above-described spacers so as to pass through approximately the center of the pixel area, the control of the thickness of the liquid crystal layer is facilitated.

Embodiment 11

Figure 17A:
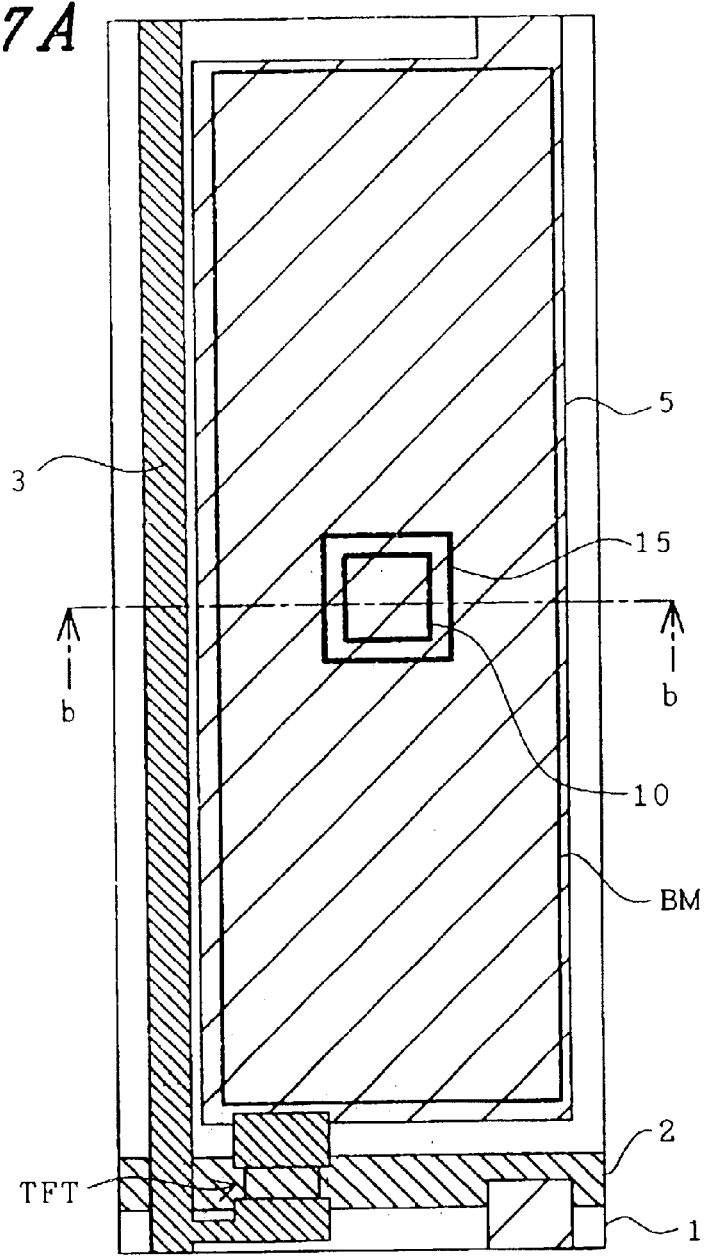
FIG. 17A is a plan view of a pixel in a liquid crystal display device in accordance with still another embodiment of the present invention.
Figure 17B:
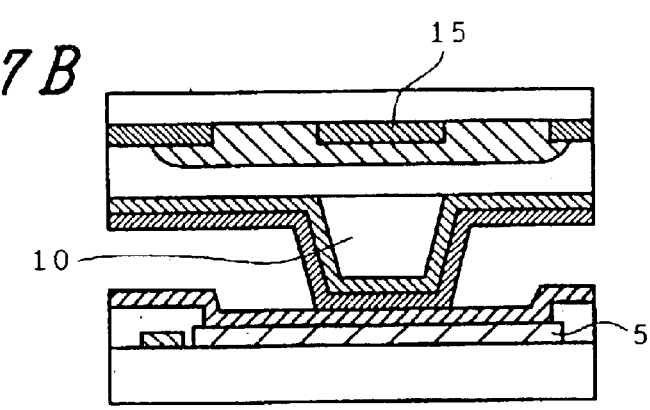
FIG. 17B is a cross-sectional view of the pixel taken along line b—b of FIG. 17A.

FIGS. 17A and 17B illustrate a configuration of another embodiment of the liquid crystal display device according to the present invention. FIG. 17A is a plan view of one of a plurality of pixels in a liquid crystal display device of the so-called vertical electric field type such as the twisted nematic type, FIG. 17B is a cross-sectional view of the pixel of FIG. 17A taken along line b—b of FIG. 17A. FIGS. 17A and 17B correspond to FIGS. 11A and 11B, respectively.

The embodiment illustrated in FIGS. 11A and 11B takes advantage of the so-called multi-domain effect, but the present embodiment aims at masking the domains.

The light-blocking film 15 is formed on the filter substrate 1B having the spacer 10 formed thereon such that the light-blocking film 15 is centered on the bottom surface of the spacer 10 and is larger in area than the bottom surface of the spacer 10. The light-blocking film 15 is made of the same material as the black matrix BM and is formed simultaneously with the black matrix BM.

Figure 18A:
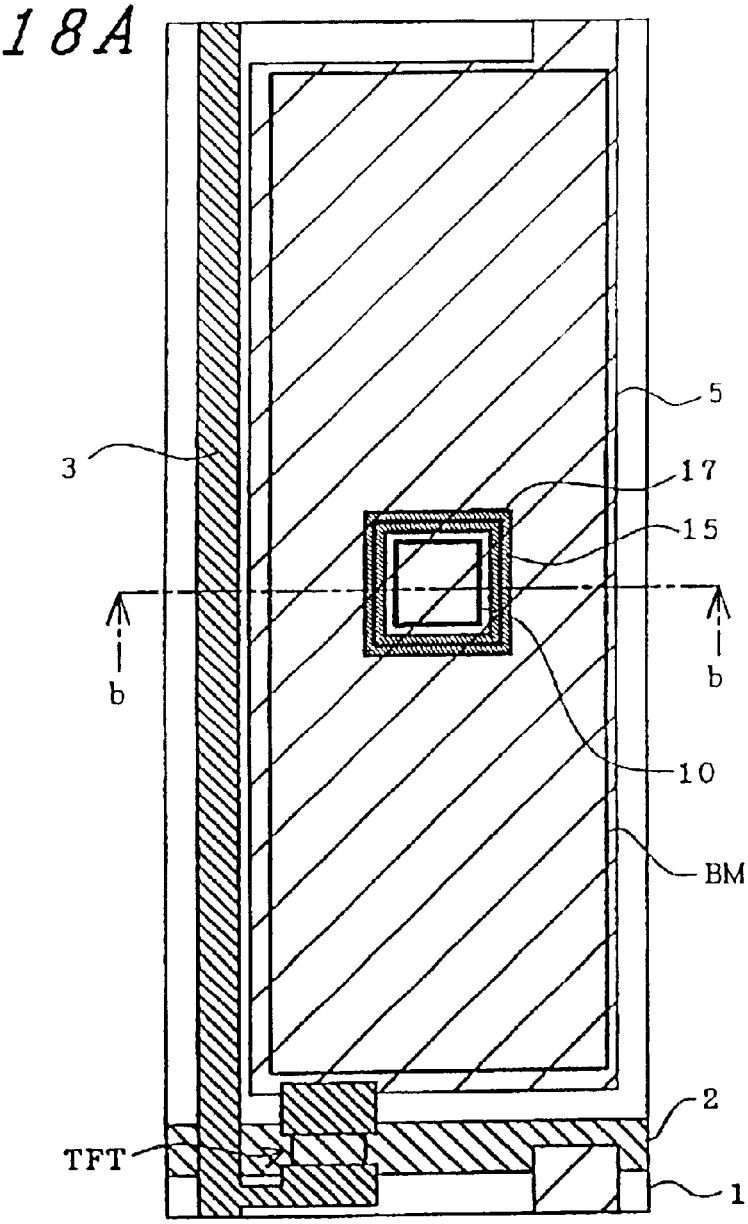
FIG. 18A is a plan view of a pixel in a liquid crystal display device in accordance with still another embodiment of the present invention.
Figure 18B:
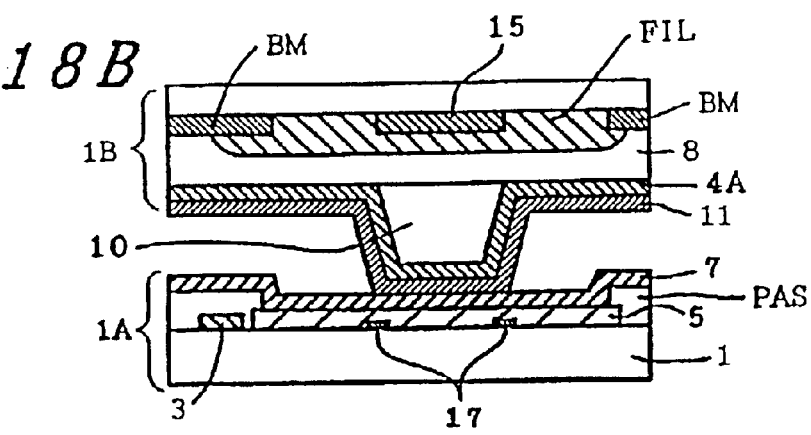
FIG. 18B is a cross-sectional view of the pixel taken along line b—b of FIG. 18A.

FIG. 18A is a plan view of a modification of the present embodiment, and FIG. 18B is a cross-sectional view of the pixel of FIG. 18A taken along line b—b of FIG. 18A. This modification aims at masking the domains occurring around the spacer 10 by light-blocking films 17 formed on the TFT substrate 1A so as to ensure reliability.

The light-blocking film 17 formed on the TFT substrate 1A is made of a metallic layer in this modification, and is formed of the same material as the gate line 2 and simultaneously with the gate line 2, for example.

In this modification, the light-blocking film 17 is annular so as to mask light from the side wall of the spacer 10, but it is not always limited to such a shape, and the light-blocking film 17 of the same shape as the light-blocking film 15 can be employed.

It may sometimes be sufficient to form the light-blocking films against the domains caused by the spacer on the TFT substrate 1A only.

Embodiment 12

Figure 19:
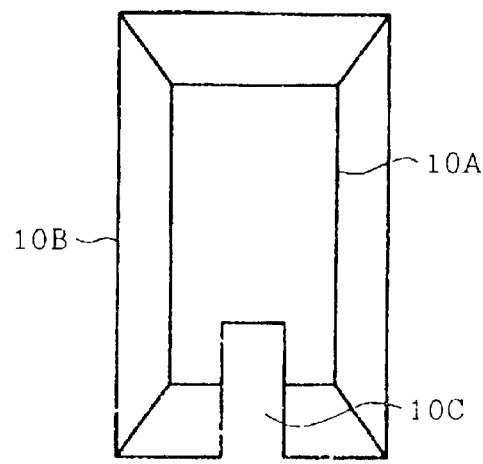
FIG. 19 is a plan view of an example of a spacer used in a liquid crystal display device of the present invention.

FIG. 19 illustrates a configuration of another embodiment of the liquid crystal display device according to the present invention, and is a plan view of the spacer 10 employed in this embodiment. The spacer 10 of this embodiment can be employed as the spacers in the previous embodiments and other liquid crystal display devices.

In FIG. 19, the spacer 10 is of the truncated quadrilateral pyramidal shape having a large-area base on the substrate side thereof and a small-area top surface 10A. That is to say, the spacer 10 is flaring and has tapering side walls.

The spacer 10 is provided with a cutout 10C which extends on a side wall from the center of one of four sides of its top surface 10A to the center of a corresponding one of four sides of its base.

The following is the reason for this configuration of the spacer 10.

Figure 20:
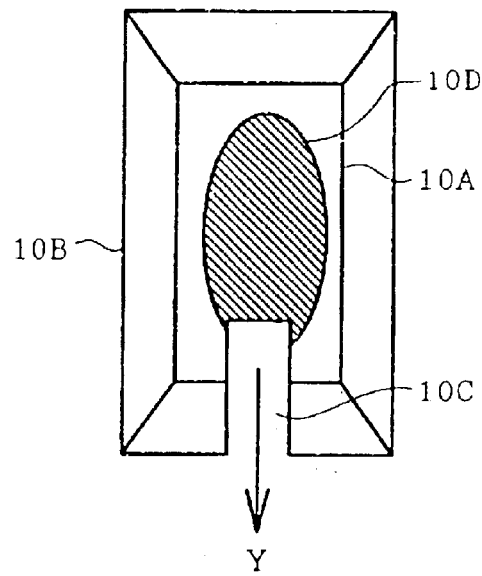
FIG. 20 is a plan view of the spacer of FIG. 19 for explaining an advantage provided by the spacer.

As shown in FIG. 20, a recess 10D is sometimes formed at the central portion of the top surface 10A of the spacer 10. The recess 10D may be formed by shrinkage when the spacer is cured or due to indentation in the substrate having the spacer formed thereon.

Air is sealed in the recess 10D when the spacer having the recess 10D on one substrate is pressed against the other substrate to assemble the liquid crystal panel, and the air is difficult to evacuate in the operation of filling the liquid crystal material into the space between the two substrates.

After the liquid crystal material is sealed in the liquid crystal panel, the air penetrates into the liquid crystal layer in the form of bubbles due to vibrations or shocks and changes the specific resistance of the liquid crystal material.

This embodiment aims at evacuating completely the air easily contained between the top surface 10A of the spacer 10 and the other substrate against which the top surface 10A is pressed, by providing the cutout 10c in the spacer 10 as explained in connection with FIG. 20. That is to say, the cutout 10C serves as means for evacuating the air from the recess 10D and as a path for the liquid crystal material to penetrate into the recess 10D.

For this object, it is not always necessary that means for evacuating the air is in the form of the cutout 10C of the above configuration, but means for evacuating the air may be in the form of a groove or indentation formed in the top surface 10A of the spacer 10, for example, or in the form of a groove or indentation traversing the top surface 10A.

The shape of the spacer 10 is not limited to the above configuration, but it may be a circle or others in a plan view.

Embodiment 13

Figure 21:
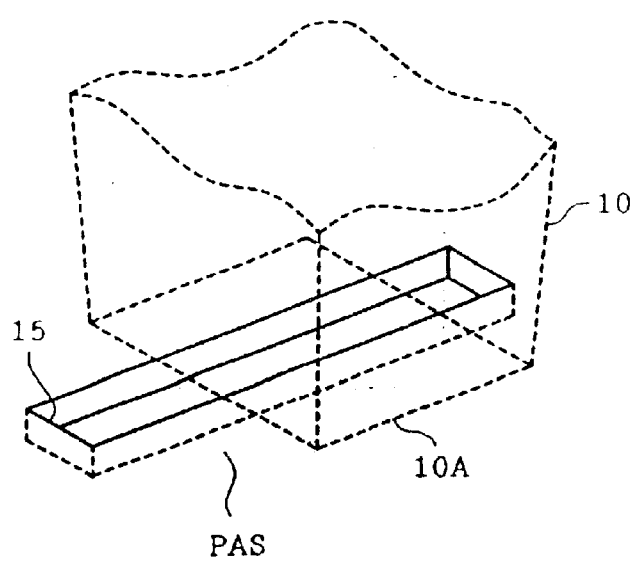
FIG. 21 is a fragmentary perspective view of a liquid crystal display device in accordance with still another embodiment of the present invention.

FIG. 21 illustrates a configuration of another embodiment of the liquid crystal display device according to the present invention, and is a fragmentary perspective view of the spacer 10 and its vicinity in this embodiment.

This embodiment aims at evacuating the air between the spacer 10 and the substrate against which the spacer is pressed as in Embodiment 12, and in this embodiment the substrate pressed against the spacer 10 is configured for the object.

As shown in FIG. 21, a groove or indentation 15 is formed in a portion of the protective film PAS on the substrate which is pressed against the spacer 10 such that the groove or indentation extends beyond the contact area between the spacer 10 and the protective film PAS.

In this embodiment, the groove or indentation 15 serves as means for evacuating the air contained between the top surface 10A of the spacer 10 and the substrate against which the top surface 10A is pressed.

Embodiment 14

Figure 22:
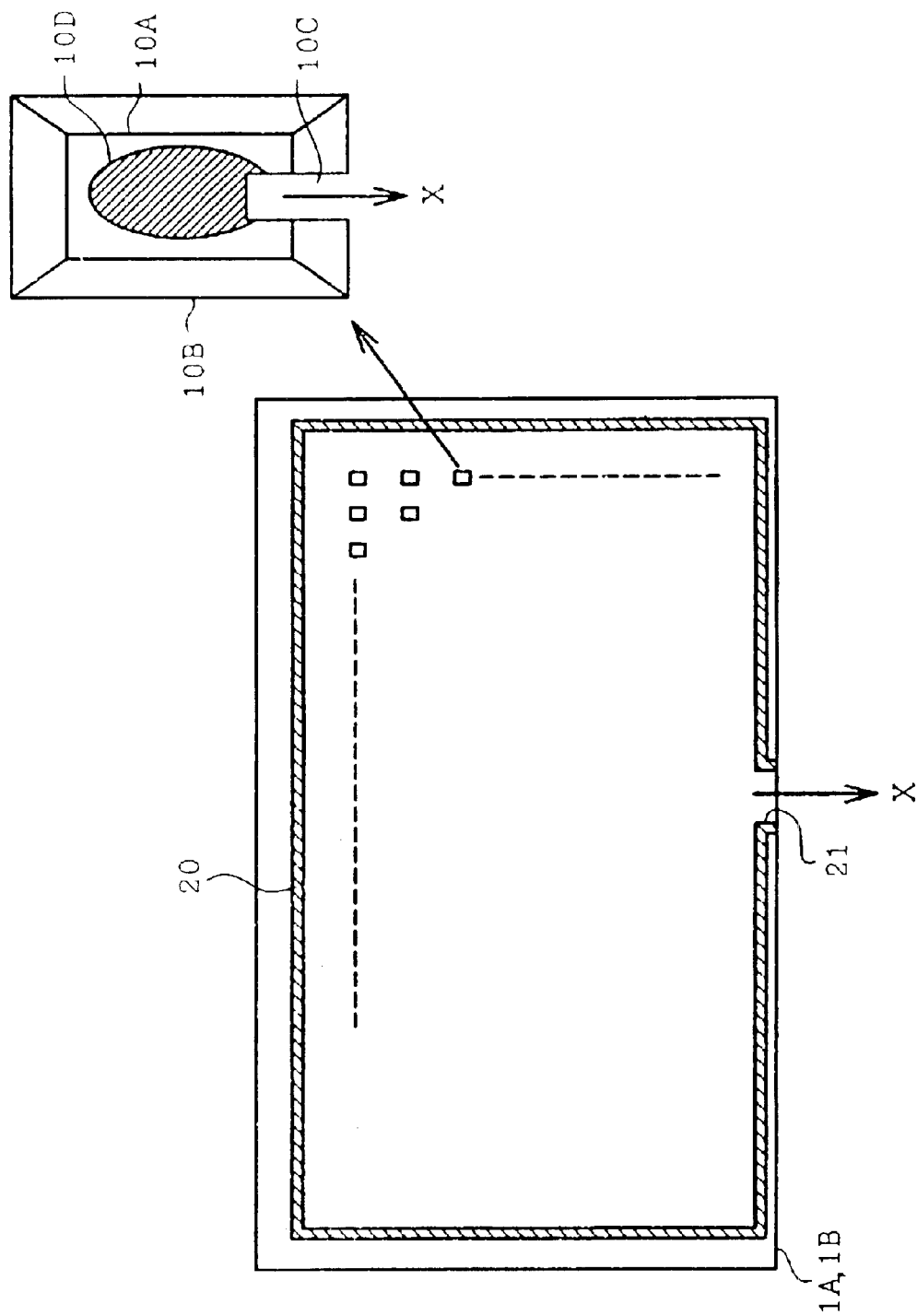
FIG. 22 is a plan view of a liquid crystal display device in accordance with still another embodiment of the present invention.

FIG. 22 is a plan view of another embodiment of the liquid crystal display device according to the present invention.

In FIG. 22, a filling hole 21 for the liquid crystal material is provided in a sealing member 20 for sealing the liquid crystal material between the substrates 1A and 1B, and the means for evacuating the air as explained in the previous embodiments is provided in the spacer 10 disposed in an area enclosed by the sealing member 20 or in the substrate against which the spacer 10 is pressed.

The exit for the air of the means for evacuating the air, the cutout 10c, for example, is directed toward the filling hole 21 for the liquid crystal material.

This configuration enables efficient evacuation of the air contained between the spacer 10 and the substrate against which the spacer 10 is pressed, via the above-explained means for evacuating the air, because the filling hole 21 for the liquid crystal material serves as the exit for evacuating air from the space between the two substrates as well as the hole for filling the liquid crystal material into a space between the two substrates, and consequently, the air contained between the spacer 10 and the substrate is directed directly into the filling hole 21 without going around the spacer 10.

Embodiment 15

Figure 23:
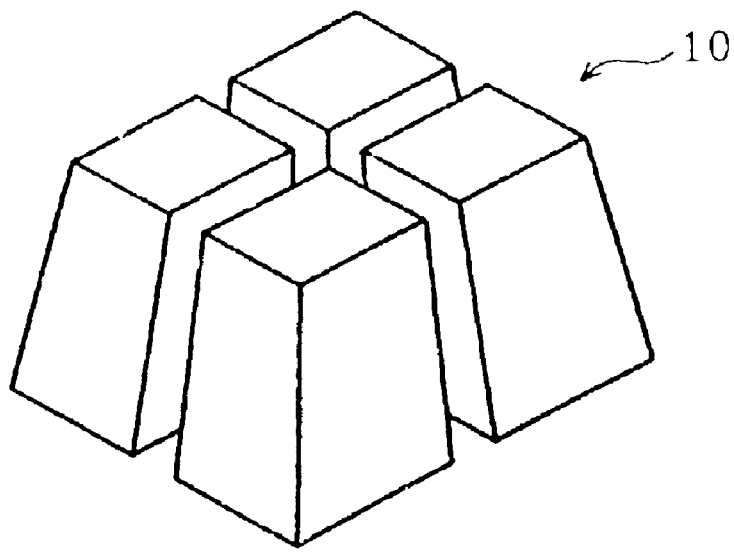
FIG. 23 is a perspective view of another example of a spacer used in a liquid crystal display device of the present invention.

FIG. 23 illustrates a configuration of another embodiment of the liquid crystal display device according to the present invention, and is a perspective view of the spacer 10 in this embodiment.

As shown in FIG. 23, the spacer 10 is subdivided into plural spacer pieces, and in other words, the spacer 10 comprises a group of subdivided spacers.

The spacer 10 having this configuration has a function of evacuating the air as in the previous embodiments, and also is provided with resiliency.

It is inevitable that the spacer 10 is subject to strong force applied by the substrate, but the spacer 10 can prevent its breakage with its resiliency.

Figure 24:
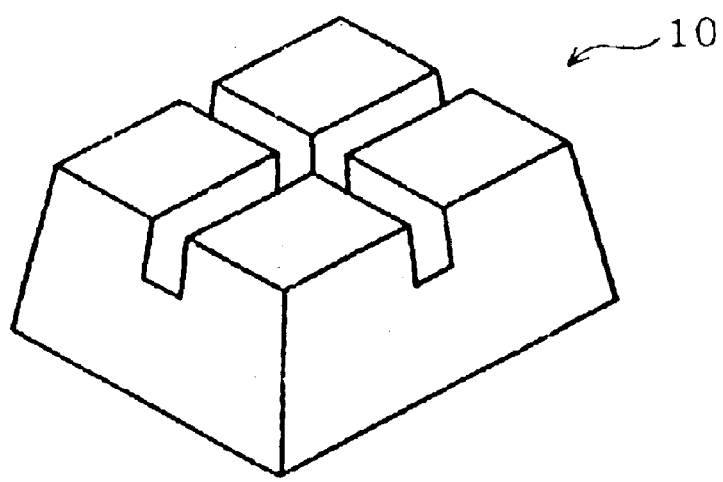
FIG. 24 is a perspective view of still another example of a spacer used in a liquid crystal display device of the present invention.

For this object, it is sufficient that the subdivision of the spacer 10 is applied to at least the top portion of the spacer 10 as shown in FIG. 24.

Embodiment 16

Figure 25:
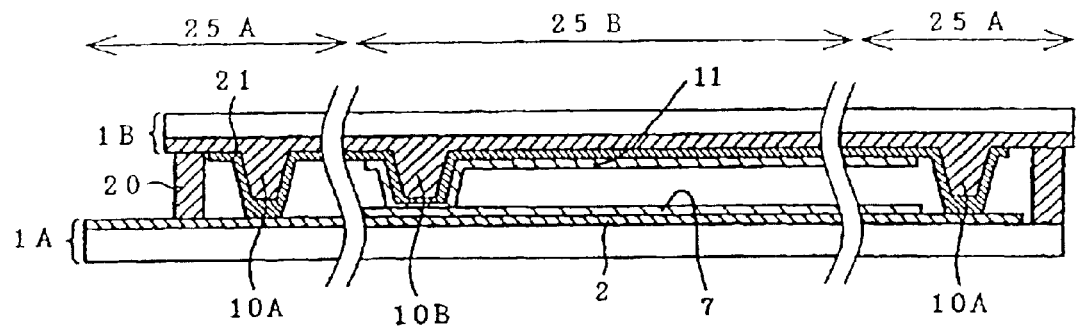
FIG. 25 is a cross-sectional view of a liquid crystal display device in accordance with still another embodiment of the present invention.

FIG. 25 illustrates a configuration of another embodiment of the liquid crystal display device of the horizontal electric field type according to the present invention, and is a cross-sectional view of the liquid crystal display device taken along one of its gate lines. The spacers 10 are fixed on the filter substrate 1B opposing the TFT substrate 1A, and comprise a first type of spacers 10B disposed in a region 25B in FIG. 25 for maintaining the spacing between the two substrates 1A, 1B and a second type of spacers 10A disposed so as to be superposed on both the ends of each of the gate lines in a region 25A in FIG. 25.

A plurality of strip-shaped conductive layers 21 are formed on the surface of the filter substrate 1B facing toward the liquid crystal layer such that each of the strip-shaped conductive layers 21 is superposed on a respective one of the gate lines 2 formed on the TFT substrate 1A, and consequently, each of the strip-shaped conductive layers 21 covers a pair of the second type of spacers 10A corresponding to one of the gate lines 2 and is electrically connected with the corresponding one of the gate lines 2.

This configuration provides a redundant circuit for each of the gate lines 2 and provides protection against unintentional line breaks in the gate lines 2.

In this embodiment, the redundant circuits are provided to the gate lines 2, the above configuration is also applicable to protection against the line breaks in the drain lines 3 by interchanging the gate line 2 with the drain line 3 in FIG. 25.

This embodiment is also applicable to the previous embodiments of the liquid crystal display device of the horizontal electric field type.

Embodiment 17

Figure 26:
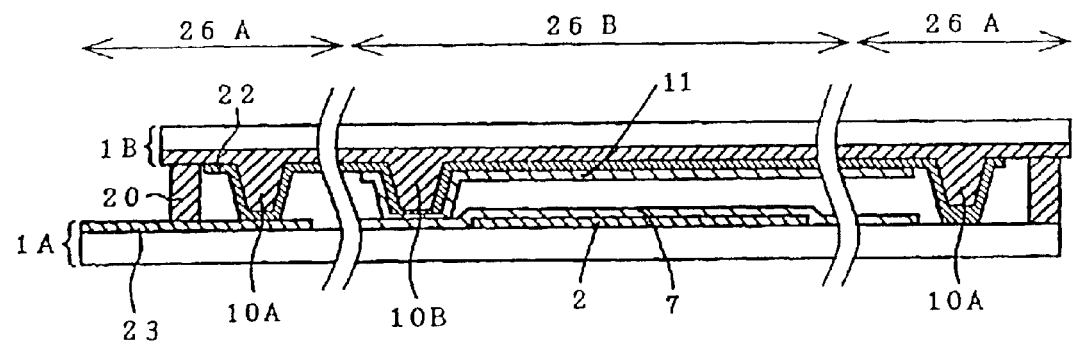
FIG. 26 is a cross-sectional view of a liquid crystal display device in accordance with still another embodiment of the present invention.

FIG. 26 illustrates a configuration of another embodiment of the liquid crystal display device of the vertical electric field type according to the present invention, and is a cross-sectional view of the liquid crystal display device taken along one of the gate lines 2. The spacers 10 are fixed on the filter substrate 1B opposing the TFT substrate 1A, and comprise a first type of spacers 10B disposed in a region 26B in FIG. 26 for maintaining the spacing between the two substrates 1A, 1B and a third type of spacers 10A disposed in the vicinity of the sealing member 20 for sealing the two substrates 1A, 1B in a region 26A in FIG. 26.

The third type of spacers 10A are formed simultaneously with the first type of spacers 10B. A common electrode (a transparent electrode) 22 facing the plural pixels in common is formed on the surface of the filter substrate 1B facing toward the liquid crystal layer including the surfaces of the spacers 10. A conductive layer 23 is formed on a region of the TFT substrate 1A against which the third type spacer 10A is pressed, such that the conductive layer 23 covers the third type spacer 10A and is electrically connected with the common electrode 22.

The conductive layer 23 extends beyond the sealing member 20 on the TFT substrate 1A so as to be connected to a terminal for supplying a reference voltage to the common electrode 22. The reference voltage supplied to the terminal on the TFT substrate 1A is applied to the common electrode 22 on the filter substrate 1B via the third type spacer 10A.

The liquid crystal display device of this configuration eliminates the need for providing an additional connecting means for bringing out the connection of the common electrode 22 onto the surface of the TFT substrate 1A.

The present embodiment is also applicable to the previous embodiments of the liquid crystal display device of the vertical electric field type.

Embodiment 18

In the previous embodiments, spacers are fixed on the TFT substrate or the filter substrate.

It is preferable to fix the spacers on the filter substrate especially when it is necessary to prevent degradation of characteristics of the thin film transistors, because fixation of the spacers on the TFT substrate requires an additional process step of selective etching for forming the spacers by a photolithographic technique, and chemicals used in the etching process may cause deterioration of the thin film transistors.

It is preferable to fix the spacers on the TFT substrate when it is necessary to register the spacers accurately with the TFT substrate. When the spacers are fixed on the filter substrate, registration errors occur in superposing the filter substrate on the TFT substrate and consequently, the spacers cannot sometimes be registered accurately with the TFT substrate.

Embodiment 19

Figure 27:
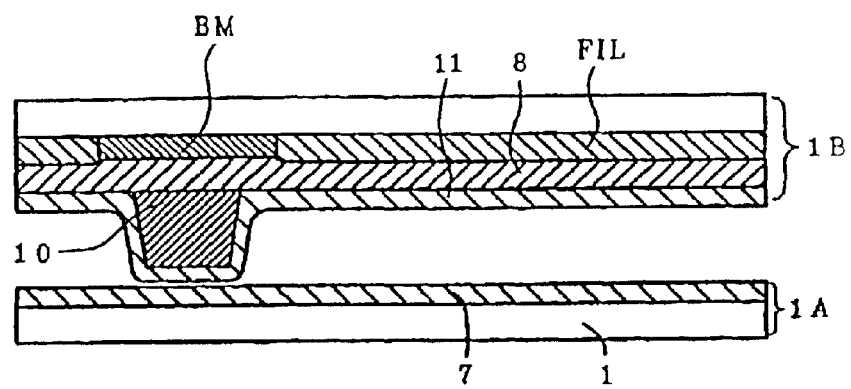
FIG. 27 is a cross-sectional view of a liquid crystal display device in accordance with still another embodiment of the present invention.

FIG. 27 is a detailed cross-sectional view of the spacer 10 fabricated on and fixed to the filter substrate 1B.

The black matrix BM and the color filter FIL are formed on the surface of the filter substrate 1B on the liquid crystal layer side thereof, and then the planarizing film 8 made of thermosetting resin is formed on the black matrix BM and the color filter FIL for planarizing the top surface of the filter substrate 1B. The spacer 10 made of photocuring resin is positioned at a predetermined position on the planarizing film 8.

Fabrication of the spacer 10 by using photocuring resin eliminates the need for the process step of selective etching, resulting in the reduction of the number of the process steps.

This embodiment is also applicable to the previous embodiments. This embodiment is not limited to fabrication of the spacers on the filter substrate 1B, but also is applicable to fabrication of the spacers on the TFT substrate 1A.

Embodiment 20

Figure 28A:
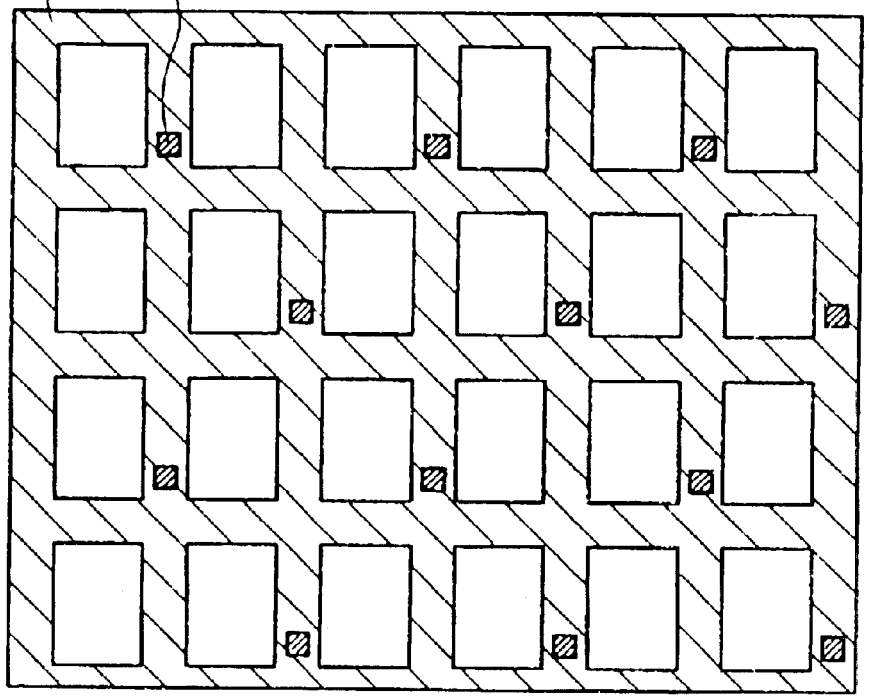
FIG. 28A is a plan view of a liquid crystal display device in accordance with still another embodiment of the present invention.

FIG. 28A is a plan view of the arrangement of the spacers 10 superposed on the black matrix BM for defining the contours of the pixels in the display area. The spacers 10 are distributed uniformly over the entire display area, and each of the spacers 10 is allotted to a group comprising the equal number of adjacent pixels. The number of the spacers 10 disposed in the display area is reduced so as to reduce the orientation defects caused by the spacers 10. This prevents occurrence of unintentional contrast produced by light leakage, especially in displaying of a black image.

Embodiment 21

Figure 28B:
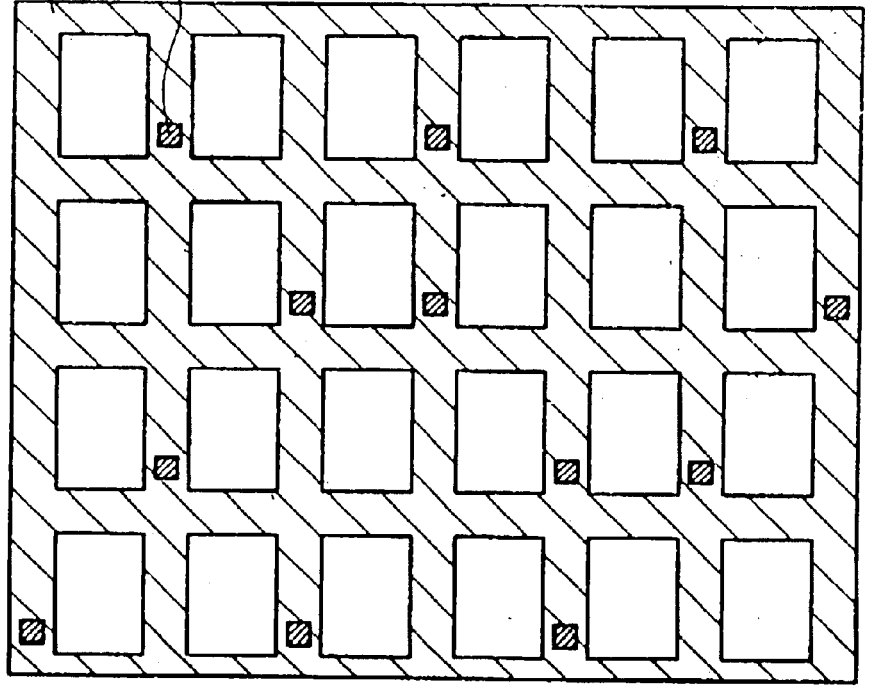
FIG. 28B is a plan view of a liquid crystal display device in accordance with still another embodiment of the present invention.

FIG. 28B is a plan view of the arrangement of the spacers 10 superposed on the black matrix BM in the display area. The number of the spacers 10 disposed in the display area is reduced as in Embodiment 20, but the difference is that spacers are arranged randomly, instead of being arranged uniformly.

The repeating pattern of light leakage is easily discernible to the human eye, and therefore the problem with the light leakage is solved by arranging the spacers randomly.

Embodiment 22

Figure 29:
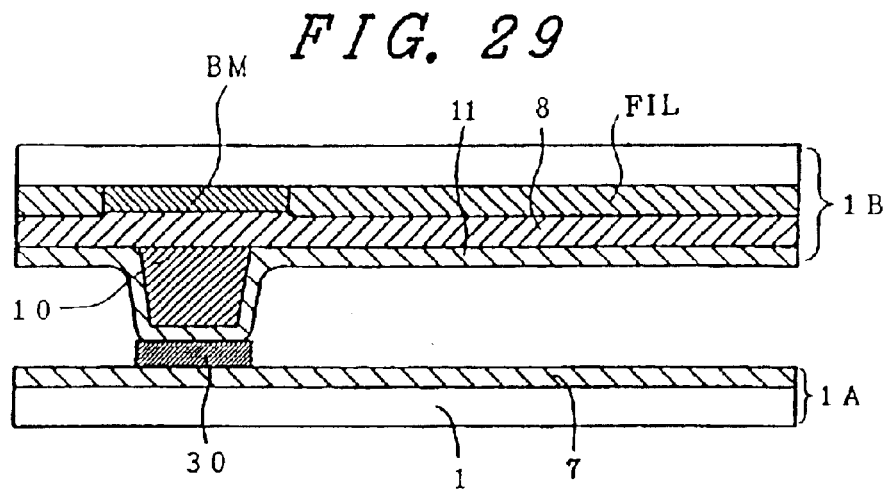
FIG. 29 is a cross-sectional view of a liquid crystal display device in accordance with still another embodiment of the present invention.

FIG. 29 illustrates a configuration of another embodiment of the liquid crystal display device according to the present invention, and is a view similar to that of FIG. 1B.

In FIG. 29, the spacer 10 is fixed to the substrate 1B and the substrate 1A is superposed on the substrate 1B, and an adhesive 30 is interposed between the spacer 10 and a region of the transparent substrate 1A against which the spacer 10 is pressed.

Suppose the adhesive 30 is not interposed between the spacer 10 and the substrate 1A, then, in the contact area between the spacer 10 and the substrate 1A, both the surfaces of the spacer 10 and the substrate 1A are covered with the orientation films made of the same material, respectively, and there arises a problem that adhesion between the two surfaces is weak.

In this embodiment, by employing the adhesive 30, a Si coupling agent, for example, the reliability in maintaining the spacing between the two substrates is secured.

The following explains an example of a method of manufacturing the liquid crystal display device of this configuration by reference to FIGS. 30A to 30E.

STEP 1

Figure 30A:
FIGS. 30A to 30E illustrate the steps of an exemplary method of manufacturing the liquid crystal display device of FIG. 29.

As shown in FIG. 30A, fabricate spacers 10 on the substrate 1B and then coat an orientation film (not shown) on the surface of the substrate 1B including the surfaces of the spacers 10.

STEP 2

Figure 30B:
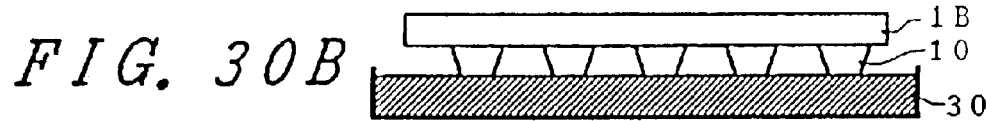

As shown in FIG. 30B, bring the top surfaces of the spacers 10 into contact with the surface of the adhesive agent 30 in a container.

STEP 3

Figure 30C:
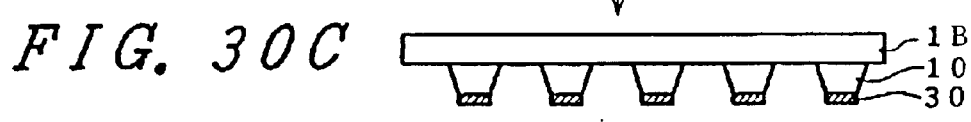

As shown in FIG. 30C, the substrate 1B with the surfaces of the spacers 10 coated with the adhesive agent 30 is obtained.

STEP 4

Figure 30D:
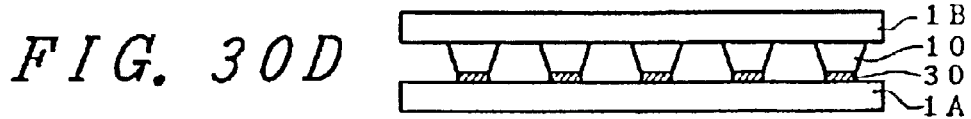

As shown in FIG. 30D, superpose the substrate 1B on the other substrate 1A.

STEP 5

Figure 30E:
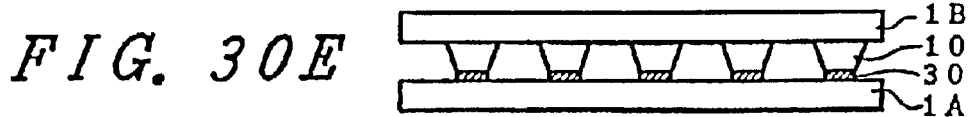

AS shown in FIG. 30E, cure the adhesive agent 30 by heating it so that the spacers are fixed to each of the two substrates 1A, 1B.

The following explains another example of a method of manufacturing the liquid crystal display device of the above configuration by reference to FIGS. 31A to 31E.

STEP 1

Figure 31A:
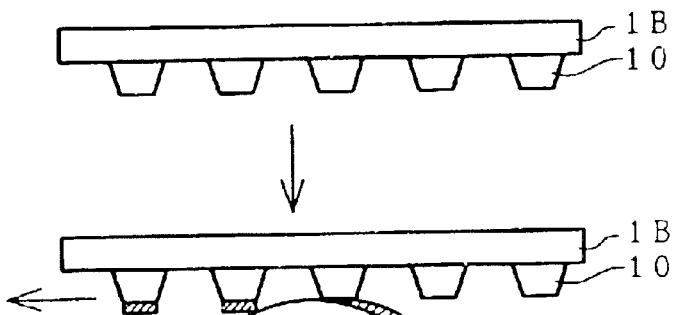
FIGS. 31A to 31E illustrate the steps of another exemplary method of manufacturing the liquid crystal display device of FIG. 29.

As shown in FIG. 31A, fabricate spacers 10 on the substrate 1B and then coat an orientation film (not shown) on the surface of the substrate 1B including the surfaces of the spacers 10.

STEP 2

Figure 31B:
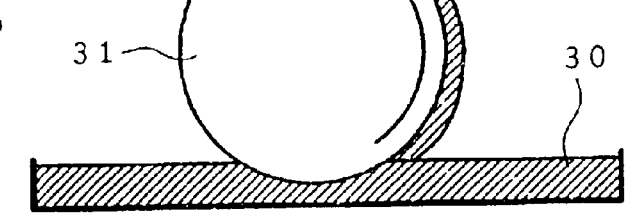

As shown in FIG. 31B, place a roller 31 between the substrate 1B and the surface of the adhesive agent 30 in a container such that the surface of the roller 31 contacts both the spacer 10 and the surface of the adhesive agent 30, then apply the adhesive agent 30 on the top surfaces of the spacers 10 by rotating the roller 31.

STEP 3

Figure 31C:
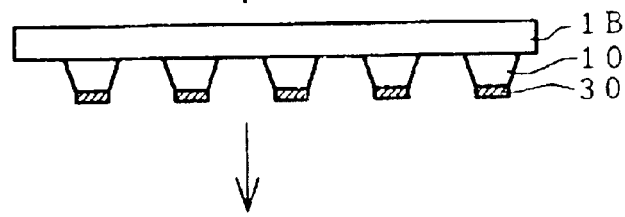

As shown in FIG. 31C, the substrate 1B with the surfaces of the spacers 10 coated with the adhesive agent 30 is obtained.

STEP 4

Figure 31D:
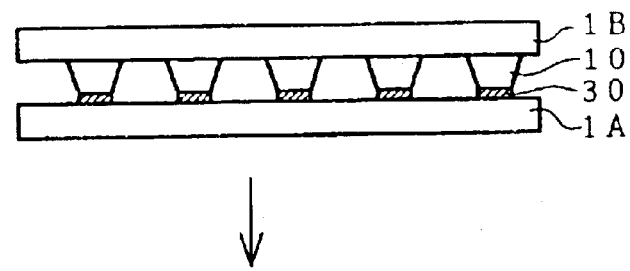

As shown in FIG. 31D, superpose the substrate 1B on the other substrate 1A.

STEP 5

Figure 31E:
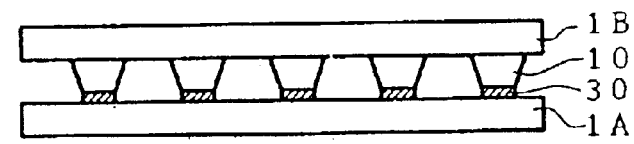

As shown in FIG. 31E, cure the adhesive agent 30 by heating it so that the spacers are fixed to each of the two substrates 1A, 1B.

This embodiment is also applicable to the previous embodiments.

Embodiment 23

Figure 32:
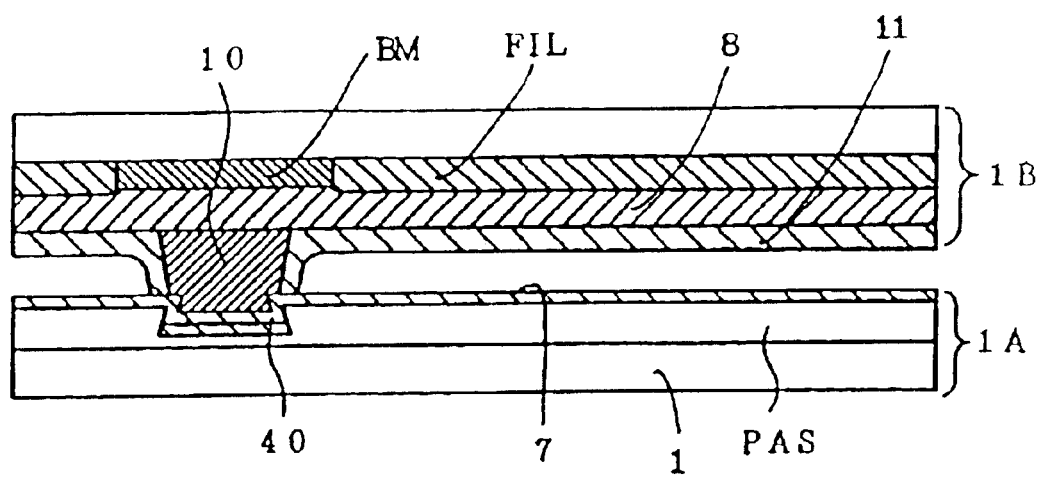
FIG. 32 is a cross-sectional view of a liquid crystal display device in accordance with still another embodiment of the present invention.

FIG. 32 illustrates a configuration of another embodiment of the liquid crystal display device according to the present invention, and is a view similar to that of FIG. 1B.

As shown in FIG. 32, a recess 40 is formed on the substrate 1A opposing the substrate 1B having the spacer 10 fixed thereto such that the top of the spacer 10 is driven into the recess 40. The recess 40 is formed in the protective film PAS on the TFT substrate 1A, for example, and has a flaring cross section. With this configuration, the top of the spacer 10 is forced into the recess 40 and is fastened tightly to the TFT substrate 1A as bonded with an adhesive agent.

Figure 33:
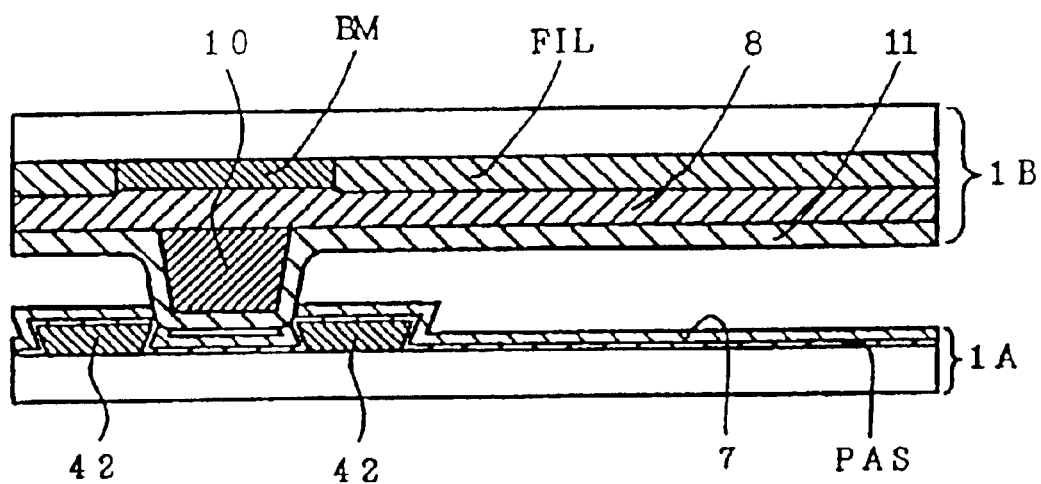
FIG. 33 is a cross-sectional view of a liquid crystal display device in accordance with still another embodiment of the present invention.

FIG. 33 illustrates a configuration of another embodiment of the liquid crystal display device according to the present invention. A groove corresponding to the recess 40 in FIG. 32 is formed by a pair of signal lines (or wiring lines) 42. The opposing side walls of the two signal lines are tapered in the opposite directions.

The configuration of this embodiment is such that the top of the spacer 10 is forced into the recess, but the present invention is not limited to this configuration.

The similar beneficial effects are obtained even if the spacer 10 and the recess or groove are configured such that the spacer 10 fits loosely into the recess or groove. This configuration does not serve to prevent variations in the spacing between the two opposing substrates (the sealing member prevents these variations), but can prevent the lateral alignment errors between the two opposing substrates.

This combination of the spacer 10 and the recess or the groove also serves as means for aligning the opposing two substrates with each other.

As is evident from the above explanation, the liquid crystal display device according to the present invention can improve the quality of displayed images.

What is claimed is:

1. A liquid crystal display device comprising:

first and second substrates, a liquid crystal layer sandwiched between the first and second substrates;

a pixel electrode formed on the first substrate;

a counter electrode formed on the second substrate; and a projection formed on one of first and second substrates, wherein the projection has a body and first, second, third and fourth branches, the first, second, third and fourth branches are shorter than the body and extend in a direction perpendicular to a direction of extension of the body, the first and second branches extend is opposite directions from each other, and the third and fourth branches extend in opposite directions from each other.

2. A liquid crystal display device according to claim 1 wherein the first and second branches are substantially equal in length to each other.

3. A liquid crystal display device according to claim 2, wherein the third and fourth branches are substantially equal in length to each other.

4. A liquid crystal display device according to claim 3, wherein the first, second, third and fourth branches are substantially equal to each other.

5. A liquid crystal display device according to claim 3, wherein the first, second, third and fourth branches are in parallel with each other, and the third and fourth branches are in parallel with each other.

6. A liquid crystal display device according to claim 1, wherein the first, second, third and fourth branches are in parallel with each other, and the third and fourth branches are in parallel with each other.

7. A liquid crystal display device comprising:

first and second substrates, a liquid crystal layer sandwiched between the first and second substrates;

a pixel electrode formed on the first substrate;

a counter electrode formed on the second substrate; and a multi-domain-effect-producing element formed on one of the first and second substrates, wherein the multi-domain-effect-producing element has a body and first, second, third and fourth branches, the first, second, third and fourth branches are shorter than the body, the first and third branches extend in a direction perpendicular to a direction of extension of the body, the first and second branches extend in opposite directions from each other, and the third and fourth branches extend in opposition directions from each other.

8. A liquid crystal display device according to claim 7, wherein the first, second, third and fourth branches are substantially equal in length to each other.

9. A liquid crystal display device according to claim 8, wherein the first, second, third and fourth branches are substantially equal in length to each other.

10. A liquid crystal display device according to claim 9, wherein the first, second, third and fourth branches are substantially equal to each other .

11. A liquid crystal display device according to claim 9, wherein the first, second, third and fourth branches are in parallel with each other, and the third and fourth branches are in parallel with each other.

12. A liquid crystal display device according to claim 7, wherein the first, second, third and fourth branches are in parallel with each other, and the third and fourth branches are in parallel with each other.

* * * * *